(12) United States Patent
Park et al.

(10) Patent No.: US 12,504,917 B2
(45) Date of Patent: Dec. 23, 2025

(54) METHOD OF OPERATING STORAGE DEVICE, STORAGE DEVICE PERFORMING THE SAME AND METHOD OF OPERATING STORAGE SYSTEM USING THE SAME

(71) Applicant: SAMSUNG ELECTRONICS CO., LTD., Suwon-si (KR)

(72) Inventors: Taejin Park, Suwon-si (KR); Kirock Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 18/585,830

(22) Filed: Feb. 23, 2024

(65) Prior Publication Data
US 2025/0085885 A1 Mar. 13, 2025

(30) Foreign Application Priority Data
Sep. 12, 2023 (KR) .................... 10-2023-0121073

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01); *G06F 2206/1004* (2013.01)
(58) Field of Classification Search
CPC .......... G06F 3/0604; G06F 2206/1004; G06F 2212/1016; G06F 2212/1044
See application file for complete search history.

(56) References Cited

U.S. PATENT DOCUMENTS

| | | |
|---|---|---|
| 7,433,948 B2 | 10/2008 | Edsall et al. |
| 7,499,410 B2 | 3/2009 | Dutt et al. |
| 7,548,975 B2 | 6/2009 | Kumar et al. |
| 7,599,360 B2 | 10/2009 | Edsall et al. |
| 7,876,711 B2 | 1/2011 | Dutt et al. |
| 8,625,460 B2 | 1/2014 | Dutt et al. |
| 8,725,854 B2 | 5/2014 | Edsall et al. |
| 9,009,427 B2 | 4/2015 | Sharma et al. |
| 9,348,749 B2 | 5/2016 | Choi et al. |
| 9,690,700 B2 | 6/2017 | Choi et al. |
| 10,282,211 B2 | 5/2019 | Parmar et al. |
| 11,645,007 B2 | 5/2023 | Yoon et al. |

(Continued)

FOREIGN PATENT DOCUMENTS

| | | |
|---|---|---|
| KR | 10-0927748 B1 | 11/2009 |
| KR | 10-2053865 B1 | 12/2019 |

(Continued)

*Primary Examiner* — Nicholas A. Paperno
(74) *Attorney, Agent, or Firm* — MORGAN, LEWIS & BOCKIUS LLP

(57) ABSTRACT

In a method of operating a storage device including at least one boot logical unit (LU), a first request is received to check whether a boot code stored in the at least one boot LU is fragmented. A first response including first information is output in response to the first request. The first information indicates whether the boot code is fragmented. When it is determined based on the first information that the boot code is fragmented, a second request is received to perform a defragmentation on the boot code. The defragmentation is performed on the boot code in response to the second request so that the boot code has physical continuity.

19 Claims, 28 Drawing Sheets

(56) References Cited

U.S. PATENT DOCUMENTS

| | | |
|---|---|---|
| 2005/0025075 A1 | 2/2005 | Dutt et al. |
| 2007/0094464 A1 | 4/2007 | Sharma et al. |
| 2007/0094465 A1 | 4/2007 | Sharma et al. |
| 2007/0094466 A1 | 4/2007 | Sharma et al. |
| 2009/0259816 A1 | 10/2009 | Sharma et al. |
| 2009/0259817 A1 | 10/2009 | Sharma et al. |
| 2014/0013034 A1* | 1/2014 | Kwon ................ G06F 12/0246 711/103 |
| 2014/0215129 A1* | 7/2014 | Kuzmin .............. G06F 12/0246 711/103 |
| 2015/0098271 A1* | 4/2015 | Lasser ................. G11C 16/10 365/185.11 |
| 2015/0220552 A1* | 8/2015 | Duzly .................... G06F 16/00 707/693 |
| 2016/0085455 A1* | 3/2016 | Cohen .................. G06F 3/0611 711/103 |
| 2017/0336981 A1* | 11/2017 | Garcia ................. G06F 3/0673 |
| 2022/0374172 A1 | 11/2022 | Kim et al. |
| 2023/0115005 A1 | 4/2023 | Cao |

FOREIGN PATENT DOCUMENTS

| | | |
|---|---|---|
| KR | 10-2021-0016227 A | 2/2021 |
| KR | 10-2022-0158372 A | 12/2022 |

\* cited by examiner

| DATA | LOGICAL ADDRESS | PHYSICAL ADDRESS |
|---|---|---|
| D1 | LA1 | PA1(001) |
| D2 | LA2 | PA2(002) |
| D3 | LA3 | PA3(003) |
| D4 | LA4 | PA4(004) |
| D5 | LA5 | PA5(005) |
| D6 | LA6 | PA6(006) |
| D7 | LA7 | PA7(007) |
| D8 | LA8 | PA8(008) |
| D9 | LA9 | PA9(009) |
| D10 | LA10 | PA10(010) |
| D11 | LA11 | PA11(011) |
| D12 | LA12 | PA12(012) |
| D13 | LA13 | PA13(013) |
| D14 | LA14 | PA14(014) |
| D15 | LA15 | PA15(015) |
| D16 | LA16 | PA16(016) |
| D17 | LA17 | PA17(017) |
| D18 | LA18 | PA18(018) |
| D19 | LA19 | PA19(019) |
| D20 | LA20 | PA20(020) |

FIG. 3A

| D1 | D2 | D3 | D4 | D5 | D6 |
|---|---|---|---|---|---|
| D7 | D8 | D9 | D10 | D11 | D12 |
| D13 | D14 | D15 | D16 | D17 | D18 |
| D19 | D20 | D5' | | | |
| | | | | | |

| DATA | LOGICAL ADDRESS | PHYSICAL ADDRESS |
|---|---|---|
| D1 | LA1 | PA1(001) |
| D2 | LA2 | PA2(002) |
| D3 | LA3 | PA3(003) |
| D4 | LA4 | PA4(004) |
| D5' | LA5 | PA5'(021) |
| D6 | LA6 | PA6(006) |
| D7 | LA7 | PA7(007) |
| D8 | LA8 | PA8(008) |
| D9 | LA9 | PA9(009) |
| D10 | LA10 | PA10(010) |
| D11 | LA11 | PA11(011) |
| D12 | LA12 | PA12(012) |
| D13 | LA13 | PA13(013) |
| D14 | LA14 | PA14(014) |
| D15 | LA15 | PA15(015) |
| D16 | LA16 | PA16(016) |
| D17 | LA17 | PA17(017) |
| D18 | LA18 | PA18(018) |
| D19 | LA19 | PA19(019) |
| D20 | LA20 | PA20(020) |

FIG. 4A

| D1 | D2 | D3 | D4 | D5 | D6 |
|---|---|---|---|---|---|
| D7 | D8 | D9 | D10 | D11 | D12 |
| D13 | D14 | D15 | D16 | D17 | D18 |
| D19 | D20 | D5' | D8' | D9' | D2' |
| D20' | D17' | D18' | | | |

| DATA | LOGICAL ADDRESS | PHYSICAL ADDRESS |
|---|---|---|
| D1 | LA1 | PA1(001) |
| D2' | LA2 | PA2'(024) |
| D3 | LA3 | PA3(003) |
| D4 | LA4 | PA4(004) |
| D5' | LA5 | PA5'(021) |
| D6 | LA6 | PA6(006) |
| D7 | LA7 | PA7(007) |
| D8' | LA8 | PA8'(022) |
| D9' | LA9 | PA9'(023) |
| D10 | LA10 | PA10(010) |
| D11 | LA11 | PA11(011) |
| D12 | LA12 | PA12(012) |
| D13 | LA13 | PA13(013) |
| D14 | LA14 | PA14(014) |
| D15 | LA15 | PA15(015) |
| D16 | LA16 | PA16(016) |
| D17' | LA17 | PA17'(026) |
| D18' | LA18 | PA18'(027) |
| D19 | LA19 | PA19(019) |
| D20' | LA20 | PA20'(025) |

QUERY REQUEST UPIU

| 0 xx010110b | 1 Flags | 2 Reserved | 3 Task Tag |
|---|---|---|---|
| 4 Reserved | 5 Query Function | 6 Reserved | 7 Reserved |
| 8 Total EHS Length(00h) | 9 Reserved | 10 (MSB) Data Segment Length | 11 (LSB) |
| 12 Transaction Specific Fields | 13 | 14 | 15 | — FR1
| 16 Transaction Specific Fields | 17 | 18 | 19 |
| 20 Transaction Specific Fields | 21 | 22 | 23 |
| 24 Transaction Specific Fields | 25 | 26 | 27 |
| 28 Reserved | 29 | 30 | 31 |
| Header E2ECRC(omit if HD=0) | | | |
| k Data[0] | k+1 Data[1] | k+2 Data[2] | k+3 Data[3] |
| ... | ... | ... | ... |
| k+Length-4 Data[Length-4] | k+Length-3 Data[Length-3] | k+Length-2 Data[Length-2] | k+Length-1 Data[Length-1] |
| Data E2ECRC(omit if DD=0) | | | |

FIG. 12B

| | QUERY RESPONSE UPIU | | | |
|---|---|---|---|---|
| 0 xx110110b | 1 Flags | 2 Reserved | 3 Task Tag | |
| 4 Reserved | 5 Query Function | 6 Query Response | 7 Reserved | |
| 8 Total EHS Length(00h) | 9 Device Information | 10 (MSB) Data Segment Length | 11 (LSB) | ← FR2 |
| 12 Transaction Specific Fields | 13 | 14 | 15 | |
| 16 Transaction Specific Fields | 17 | 18 | 19 | |
| 20 Transaction Specific Fields | 21 | 22 | 23 | |
| 24 Transaction Specific Fields | 25 | 26 | 27 | |
| 28 Reserved | 29 | 30 | 31 | |
| Header E2ECRC(omit if HD=0) | | | | |
| k Data[0] | k+1 Data[1] | k+2 Data[2] | k+3 Data[3] | |
| k+Length-4 Data[Length-4] | k+Length-3 Data[Length-3] | k+Length-2 Data[Length-2] | k+Length-1 Data[Length-1] | |
| Data E2ECRC(omit if DD=0) | | | | |

FIG. 12C

| IDN | Name | Attributes | | | | |
|---|---|---|---|---|---|---|
| | | Access Property | Size | Type /#Ind. /#sel. | MDV | Description |
| 80h (20h) | bNeedBIDOperation | Read only | 1 byte | D | 00h | Return BID Status 00h : No need to do BID 01h : Need to do BID |
| 81h (21h) | bDoBIDOperation | Read / Volatile | 1 byte | D | 00h | BID execution |

FIG. 24

| START LOGICAL ADDRESS | LA1 |
|---|---|
| START PHYSICAL ADDRESS | PA1(001) |
| COUNT VALUE | 20 |

METHOD OF OPERATING STORAGE DEVICE, STORAGE DEVICE PERFORMING THE SAME AND METHOD OF OPERATING STORAGE SYSTEM USING THE SAME

CROSS-REFERENCE TO RELATED APPLICATION

This patent application claims priority under 35 USC § 119 to Korean Patent Application No. 10-2023-0121073 filed on Sep. 12, 2023 in the Korean Intellectual Property Office (KIPO), the disclosure of which is incorporated by reference in its entirety herein.

1. Technical Field

Example embodiments relate generally to semiconductor integrated circuits, and more particularly to methods of operating storage devices, storage devices performing the methods, and methods of operating storage systems using the methods.

2. Discussion of the Related Art

A semiconductor memory device is a type of electronic memory that uses semiconductor materials to store digital data. A data storage device may include one or more semiconductor memory devices. Examples of such data storage devices include solid state drives (SSDs). An SSD may be chosen over a hard disk drive (HHD) due to the absence of moving mechanical parts, higher data access speeds, stability, durability, and/or low power consumption. Various systems, such as laptop computers, cars, airplanes, and drones may include an SSD for data storage.

The SSD may include a flash memory device to store large quantities of data. The flash memory may support a higher operating speed when the SSD includes a universal flash storage (UFS) interface defined by the joint electron device engineering council (JEDEC) standard.

SUMMARY

At least one example embodiment of the present disclosure provides a method of operating a storage device with increased read performance in a boot operation and which resolves limitations of increasing a size of a boot logical unit (LU).

At least one example embodiment of the present disclosure provides a storage device performing the method of operating the storage device.

At least one example embodiment of the present disclosure provides a method of operating a storage system using the method of operating the storage device.

According to an example embodiment, in a method of operating a storage device including at least one boot logical unit (LU), a first request is received to check whether boot code stored in the at least one boot LU is fragmented. A first response including first information is output in response to the first request. The first information indicates whether the boot code is fragmented. When it is determined based on the first information that the boot code is fragmented, a second request is received to perform a defragmentation on the boot code. The defragmentation is performed on the boot code in response to the second request so that the boot code has physical continuity.

According to an example embodiment, a storage device includes a plurality of nonvolatile memories and a storage controller. The plurality of nonvolatile memories form a plurality of logical units (LUs). The plurality of LUs include at least one boot LU configured to store boot code. The storage controller controls operations of the plurality of nonvolatile memories, receives a first request to check whether the boot code is fragmented, outputs a first response including first information in response to the first request, receives a second request to perform a defragmentation on the boot code when it is determined based on the first information that the boot code is fragmented, and performs the defragmentation on the boot code in response to the second request so that the boot code has physical continuity. The first information indicates whether the boot code is fragmented.

According to an example embodiment, in a method of operating a storage system including a host device and a universal flash storage (UFS) device, a first query request is transmitted, by the host device, to the UFS device to request that the UFS device check whether a boot code stored in at least one boot logical unit (LU) included in the UFS device is fragmented. A first query response is transmitted, by the UFS device, to the host device in response to the first query request. The first query response includes first information indicating whether the boot code is fragmented. It is determined, by the host device, whether the boot code is fragmented based on the first information. When it is determined that the boot code is fragmented, a second query request is transmitted, by the host device, to the UFS device to instruct the UFS device to perform a defragmentation on the boot code.

In a method of operating a storage device, a storage device and a method of operating the storage system according to example embodiments, it may be checked, based on a newly defined command (e.g., the first request), whether the boot code is fragmented. In addition, when it is determined that the boot code is fragmented, the defragmentation may be performed on the boot code based on another newly defined command (e.g., the second request). The boot code may have physical continuity by performing the defragmentation, and in a boot operation thereafter, the boot code may be read or retrieved using a sequential read scheme without using a logical-to-physical mapping table. Accordingly, the read performance of the boot logical unit may be ensured or guaranteed to be about 100%, the limitation of increasing the size of the boot logical unit may be resolved, and the storage device and the storage system including the storage device may have enhanced performance.

BRIEF DESCRIPTION OF THE DRAWINGS

Illustrative, non-limiting example embodiments will be more clearly understood from the following detailed description taken in conjunction with the accompanying drawings.

FIGS. 2A, 2B, 3A, 3B, 4A, 4B and 5 are diagrams for describing a method of operating a storage device according to an example embodiment.

FIGS. 11, 12A, 12B, 12C and 13 are diagrams related to an operation of FIG. 1.

FIGS. 23 and 24 are diagrams related to a method of operating a storage device according to an example embodiment.

DETAILED DESCRIPTION

Figure 1:
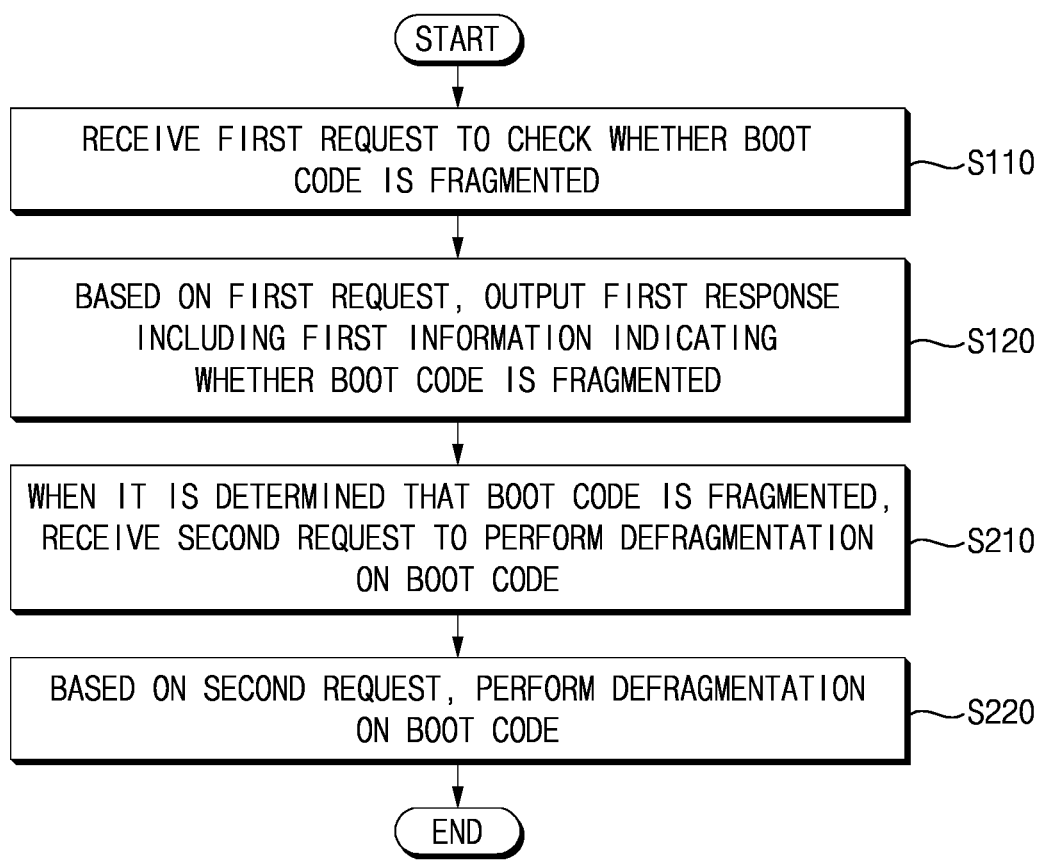
FIG. 1 is a flowchart illustrating a method of operating a storage device according to an example embodiment.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of operating a storage device according to an example embodiment.

Referring to FIG. 1, a method of operating a storage device according to an example embodiment is performed by a storage device that includes at least one boot logical unit (LU). The storage device may operate based on requests and/or commands received from a host device that is located outside the storage device.

The storage device may include a plurality of logical units, and at least one of the plurality of logical units may be used as a boot logical unit that stores a boot code. Each of the plurality of logical units may be an externally addressable, independent, processing entity that processes a command from the host device. The host device may manage a storage space of the storage device through the plurality of logical units. Each of the plurality of logical units may be used to store data in the storage device. The boot code may include a set of instructions that are executed when the storage device and a storage system including the storage device start operating. When the boot code is executed, the storage system may prepare to execute or run an operating system (OS). Configurations of the storage device and the storage system will be described with reference to FIGS. 6, 7, 8, 9 and 10.

In the method of operating the storage device according to an example embodiment, the storage device receives a first request (e.g., a signal, a command, etc.) from the host device (operation S110). The first request is used to check whether boot code stored in at least one boot logical unit is fragmented. In an embodiment, the boot code is fragmented when it is stored in non-contiguous sectors. The storage device outputs a first response to the host device based on or in response to the first request (operation S120). The first response includes first information indicating or representing whether the boot code is fragmented.

When it is determined based on the first response that the boot code is fragmented, the storage device receives a second request from the host device (operation S210). The second request is used to perform a defragmentation on the boot code. The storage device performs the defragmentation on the boot code based on the second request such that the boot code has physical continuity (operation S220). In an embodiment, the defragmentation performs operations (e.g., reads, writes, erases, etc.) to ensure that the boot code is stored in contiguous sequential sectors.

The fragmentation of the boot code and the defragmentation performed on the boot code will be described in detail with reference to FIGS. 2A, 2B, 3A, 3B, 4A, 4B and 5.

In an example embodiment, the storage device is a universal flash storage (UFS) device (or UFS storage device) that operates based on a UFS interface defined by the joint electron device engineering council (JEDEC) standard. For example, each of the first request and the second request may be provided based on a query request defined in a UFS standard, and the first response is provided based on a query response defined in the UFS standard. The query request and the query response will be described with reference to FIGS. 12A, 12B and 12C.

In an example embodiment, when it is determined based on the first response that the boot code is not fragmented, e.g., when the boot code is stored with physical continuity, the process may be terminated without performing operations S210 and S220.

In the method of operating the storage device according to an example embodiment, it is checked, based on a newly defined command (e.g., the first request), whether the boot code is fragmented. In addition, when it is determined that the boot code is fragmented, the defragmentation may be performed on the boot code based on another newly defined command (e.g., the second request). The boot code may have physical continuity after performing the defragmentation. In a boot operation thereafter, the boot code may be read or retrieved using a sequential read scheme without using a logical-to-physical mapping table. Accordingly, the read performance of the boot logical unit may be ensured or guaranteed to be about 100%. Further, limitation in increasing the size of the boot logical unit may be resolved. Thus, the storage device and the storage system including the storage device may operate with enhanced performance.

FIGS. 2A, 2B, 3A, 3B, 4A, 4B and 5 are diagrams for describing a method of operating a storage device according to an example embodiment.

An example of a boot logical unit 50 included in a storage device according to an example embodiments is illustrated in FIG. 2.

The boot logical unit 50 may store a boot code BC. The boot code BC may include a plurality of boot data D1, D2, D3, D4, D5, D6, D7, D8, D9, D10, D11, D12, D13, D14, D15, D16, D17, D18, D19 and D20 that are sequentially read and executed. For example, when the boot code BC is to be read and executed, the plurality of boot data D1 to D20 may be read and executed sequentially from the boot data D1 to the boot data D20.

Figures 2A, 2B:
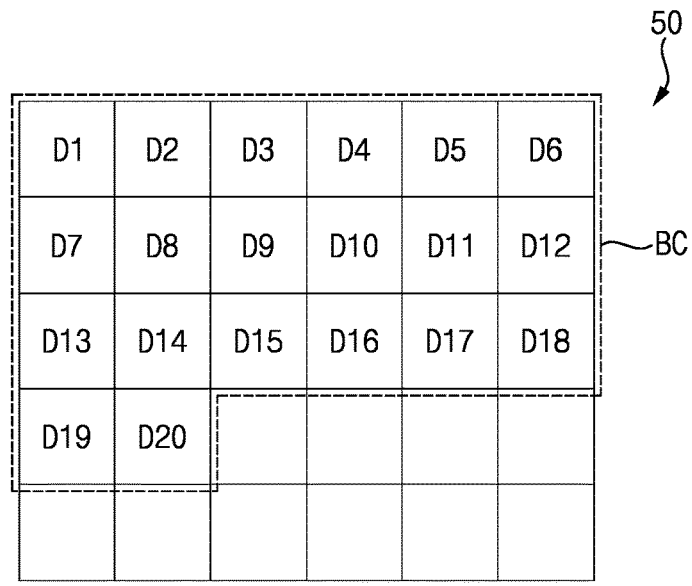

As illustrated in FIG. 2A, in an initial operation time of the storage device or at the beginning of an operation of the storage device, the boot code BC may be written into the boot logical unit 50 to have physical continuity. For example, the boot code BC may be written into the boot logical unit 50 such that an order of reading and executing the plurality of boot data D1 to D20 and an order of physically storing the plurality of boot data D1 to D20 are equal to each other. In FIG. 2A and subsequent figures, a rectangle without reference letters may indicate an empty storage space in which no data is stored.

Referring to FIG. 2B, an example of a relationship or correspondence between a plurality of logical addresses LA1, LA2, LA3, LA4, LA5, LA6, LA7, LA8, LA9, LA10, LA11, LA12, LA13, LA14, LA15, LA16, LA17, LA18, LA19 and LA20 and a plurality of physical addresses PA1, PA2, PA3, PA4, PA5, PA6, PA7, PA8, PA9, PA10, PA11, PA12, PA13, PA14, PA15, PA16, PA17, PA18, PA19 and PA20 for the plurality of boot data D1 to D20 stored in the boot logical unit 50 of FIG. 2A is illustrated. For example, the plurality of logical addresses LA1 to LA20 may be logical page numbers, and the plurality of physical addresses PA1 to PA20 may be physical page numbers, but example embodiments are not limited thereto.

A logical address may be an address of a storage space (e.g., a logical storage space) recognized by a host device, and a physical address may be an address of an actual storage space (e.g., a physical storage space) included in a nonvolatile memory of a storage device. The host device may manage data by recognizing that storage spaces in the storage device are sequentially arranged from a first storage space to a last storage space. However, an actual arrangement of storage spaces in the storage device may be different from the arrangement of the storage spaces in the storage device recognized by the host device. Locations and sequences of data recognized by the host device may also be different from locations and sequences of data actually stored in the storage device. Thus, when a specific storage space of the storage device is to be accessed, the logical address received from the host device may be translated or converted into the physical address, and a mapping table may be used for the logical-to-physical address translation.

In the initial operation time of the storage device, the boot code BC may have physical continuity, and thus the plurality of physical addresses PA1 to PA20 for the plurality of boot data D1 to D20 may have consecutive values. For example, the plurality of physical addresses PA1 to PA20 may have values that sequentially increase or decrease. For example, FIG. 2B illustrates an example where the plurality of physical addresses PA1 to PA20 have values that sequentially increase from '001' to '020', but example embodiments are not limited thereto.

Referring to FIG. 3A, an example of a change in data stored in the boot logical unit 50 of FIG. 2A while the storage device is operating is illustrated.

When or while the storage device is operating or being driving, the boot code BC stored in the boot logical unit 50 may be managed such that only some information or data in the boot code BC is updated. For example, among the plurality of boot data D1 to D20 in FIG. 2A, the boot data D5 is updated. For example, due to operating characteristics of the nonvolatile memory, updated boot data D5' is not overwritten in the storage space where the boot data D5 was stored, and the boot data D5 is updated by storing the updated boot data D5' in an empty storage space and by treating or handling the previous (or existing) boot data D5 as invalid data. In FIG. 3A and subsequent figures, a hatched rectangle indicates a storage space including invalid data.

Even if the boot data D5 is changed to the updated boot data D5', when the boot code BC is to be read and executed, the plurality of boot data D1 to D4, D5' and D6 to D20 should be read and executed sequentially from the boot data D1 to the boot data D20. However, since the physical storage location of the updated boot data D5' has changed, an order of reading and executing the plurality of boot data D1 to D4, D5' and D6 to D20 and an order of physically storing the plurality of boot data D1 to D4, D5' and D6 to D20 may be at least partially inconsistent.

Referring to FIG. 3B, an example of a relationship between a plurality of logical addresses LA1 to LA20 and a plurality of physical addresses PA1 to PA4, PA5' and PA6 to PA20 for the plurality of boot data D1 to D4, D5' and D6 to D20 stored in the boot logical unit 50 of FIG. 3A is illustrated.

As compared with FIG. 2B, the plurality of logical addresses LA1 to LA20 are not changed, but a physical address PA5' corresponding to the updated boot data D5' is changed because the physical storage location of the updated boot data D5' has changed. For example, the value of the physical address PA5 for the boot data D5 in FIG. 2B may be '005', and a value of the physical address PA5' for the updated boot data D5' in FIG. 3B may be '021'. For example, unlike the example of FIG. 2B, at least some of the plurality of physical addresses PA1 to PA4, PA5' and PA6 to PA20 have discontinuous values.

An example of a change in data stored in the boot logical unit 50 of FIG. 3A while the storage device is operating is illustrated in FIG. 4A. The descriptions repeated with FIGS. 2A and 3A will be omitted.

When the storage device continues to operate, other information or data in the boot code BC stored in the boot logical unit 50 may be additionally updated. For example, among the plurality of boot data D1 to D4, D5' and D6 to D20 in FIG. 3A, the boot data D8, D9, D2, D20, D17 and D18 are updated additionally and sequentially. In addition, updated boot data D8', D9', D2', D20', D17' and D18' are stored additionally and sequentially in empty storage spaces, and the previous boot data D8, D9, D2, D20, D17 and D18 are treated as invalid data. Therefore, the inconsistency or discrepancy between an order of reading and executing the plurality of boot data D1, D2', D3, D4, D5', D6, D7, D8', D9', D10 to D16, D17', D18', D19 and D20' and an order of physically storing the plurality of boot data D1, D2', D3, D4, D5', D6, D7, D8', D9', D10 to D16, D17', D18', D19 and D20' may become more severe, worse, degraded or deteriorated.

Referring to FIG. 4B, an example of a relationship between a plurality of logical addresses LA1 to LA20 and a plurality of physical addresses PA1, PA2', PA3, PA4, PA5', PA6, PA7, PA8', PA9', PA10 to PA16, PA17', PA18', PA19 and PA20' for the plurality of boot data D1, D2', D3, D4, D5', D6, D7, D8', D9', D10 to D16, D17', D18', D19 and D20' stored in the boot logical unit 50 of FIG. 4A is illustrated.

As compared with FIG. 3B, physical addresses PA8', PA9', PA2', PA20', PA17' and PA18' corresponding to the updated boot data D8', D9', D2', D20', D17' and D18' are additionally changed. For example, values of the physical addresses PA8', PA9', PA2', PA20', PA17' and PA18' for the updated boot data D8', D9', D2', D20', D17' and D18' may be '022', '023', '024', '025', '026' and '027', respectively. For example, the discontinuity in the values of the plurality of physical addresses PA1, PA2', PA3, PA4, PA5', PA6, PA7, PA8', PA9', PA10 to PA16, PA17', PA18', PA19 and PA20' may become more severe, worse, degraded or deteriorated.

In some example embodiments, as illustrated in FIGS. 3A and 3B, when the boot code BC is updated and the boot logical unit 50 includes one or more (e.g., only one) invalid data, e.g., when the order of reading and executing the plurality of boot data and the order of physically storing the plurality of boot data are at least partially inconsistent and the plurality of physical addresses do not have consecutive values even for a single part, it may be determined that the boot code BC is fragmented. In other example embodiments, as illustrated in FIGS. 4A and 4B, when the number of invalid data included in the boot logical unit 50 is greater than or equal to a predetermined number, it may be determined that the boot code BC is fragmented.

Figure 5:
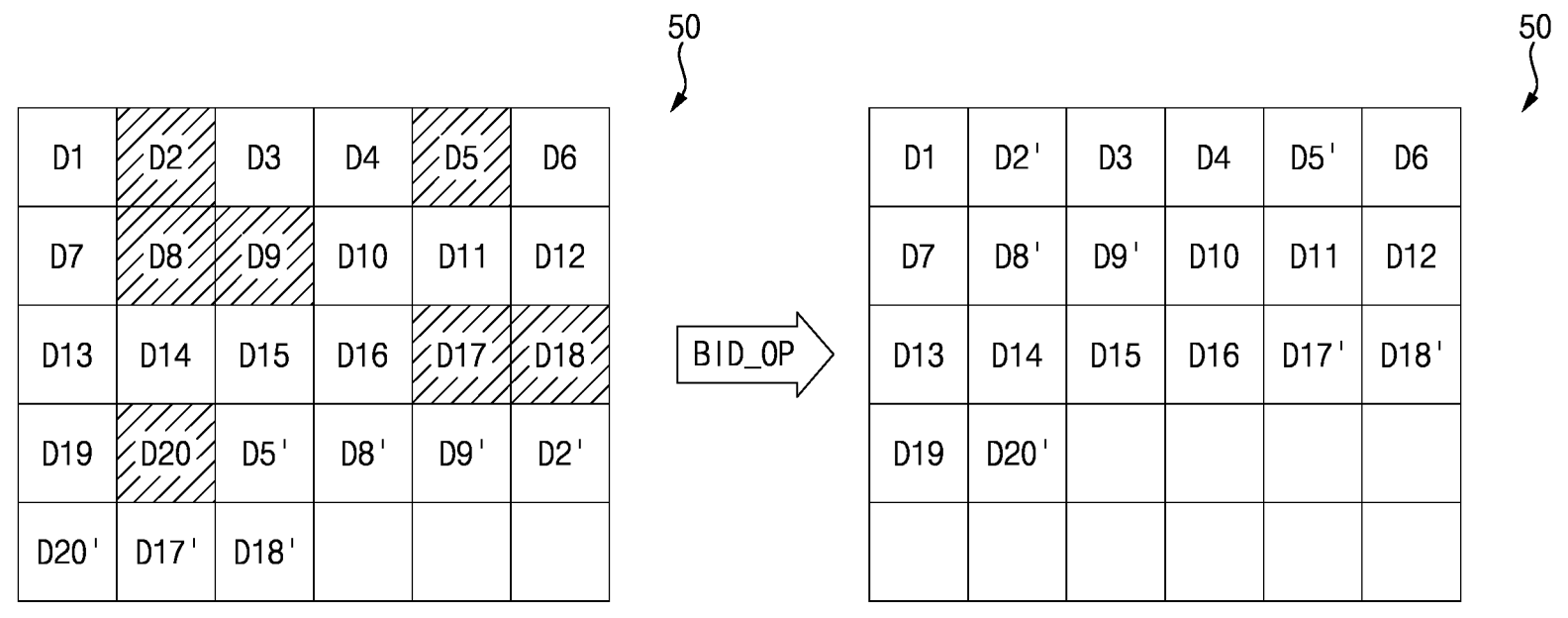

Referring to FIG. 5, an example of performing a defragmentation on the boot logical unit 50 of FIG. 4A is illustrated.

When a defragmentation BID_OP is performed on the boot code BC stored in the boot logical unit 50 according to an example embodiment, the plurality of boot data D1, D2', D3, D4, D5', D6, D7, D8', D9', D10 to D16, D17', D18', D19 and D20' may be rewritten. For example, the plurality of boot data D1, D2', D3, D4, D5', D6, D7, D8', D9', D10 to D16, D17', D18', D19 and D20' may be rewritten such that the order of reading and executing the plurality of boot data D1, D2', D3, D4, D5', D6, D7, D8', D9', D10 to D16, D17', D18', D19 and D20' and the order of physically storing the plurality of boot data D1, D2', D3, D4, D5', D6, D7, D8', D9', D10 to D16, D17', D18', D19 and D20' are equal to each other. For example, an erase operation may be performed on the boot logical unit 50, and then a program (or write) operation may be performed on the boot logical unit 50 such that the plurality of boot data D1, D2', D3, D4, D5', D6, D7, D8', D9', D10 to D16, D17', D18', D19 and D20' included in the boot code BC are sequentially programmed into the empty boot logical unit 50 on which the erase operation is performed. The defragmentation BID_OP according to an example embodiment may be referred to as a boot LU initiated defragmentation (BID) operation.

When the defragmentation BID_OP is performed on the boot code BC, the plurality of physical addresses PA1, PA2', PA3, PA4, PA5', PA6, PA7, PA8', PA9', PA10 to PA16, PA17', PA18', PA19 and PA20' for the plurality of boot data D1, D2', D3, D4, D5', D6, D7, D8', D9', D10 to D16, D17', D18', D19 and D20' have consecutive values again. For example, the plurality of physical addresses PA1, PA2', PA3, PA4, PA5', PA6, PA7, PA8', PA9', PA10 to PA16, PA17', PA18', PA19 and PA20' may have values that sequentially increase or decrease. For example, the plurality of physical addresses PA1, PA2', PA3, PA4, PA5', PA6, PA7, PA8', PA9', PA10 to PA16, PA17', PA18', PA19 and PA20' have values that sequentially increase from '001' to '020', similar to the example in the initial operation time described with reference to FIGS. 2A and 2B.

If at least a part of the boot code BC is updated and the boot code BC does not have physical continuity while the storage device is operating as illustrated in FIGS. 3A and 4A, information similar to that illustrated in FIGS. 3B and 4B (e.g., a logical-to-physical mapping table) may be required to read the boot code BC. In contrast, if the boot code BC has physical continuity in the initial operation time as illustrated in FIG. 2A or by performing the defragmentation BID_OP according to example embodiments as illustrated in FIG. 5, the boot code BC may be read without using the logical-to-physical mapping table, and thus the storage device may have increased performance. An operation of reading the boot code BC without using the logical-to-physical mapping table will be described with reference to FIGS. 22, 23 and 24.

Figure 6:
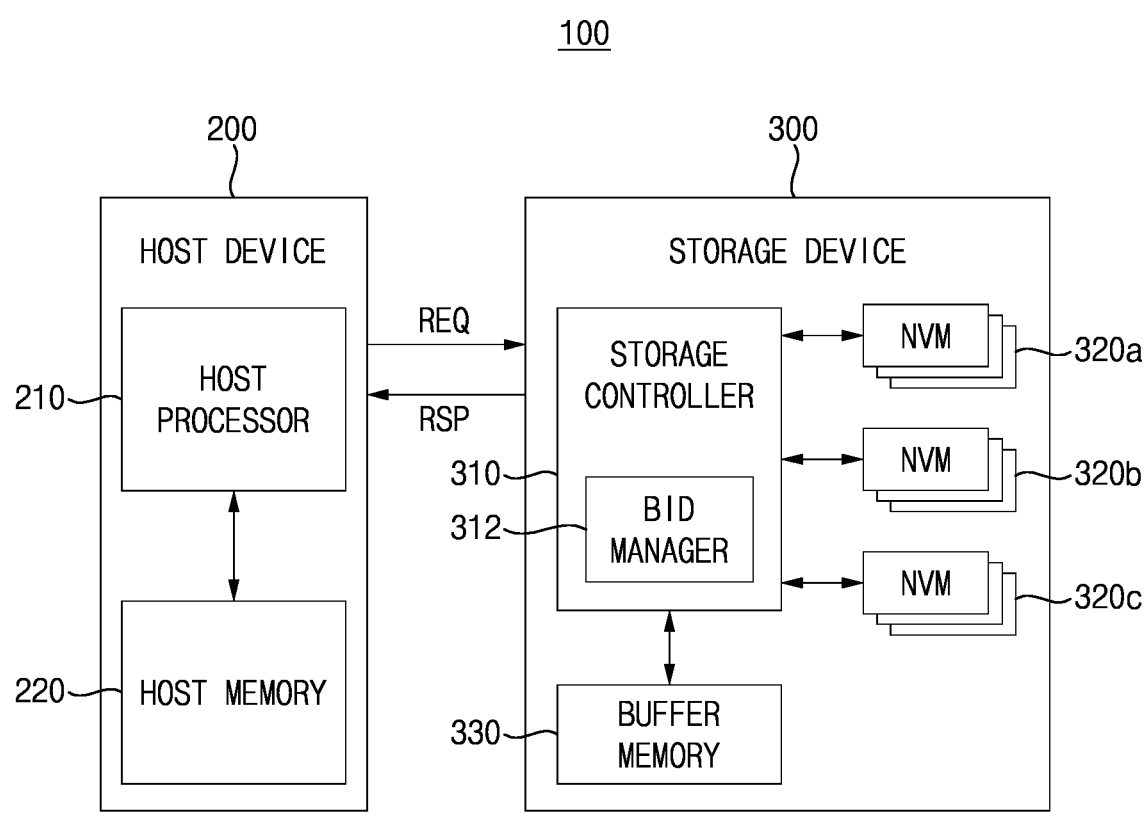
FIG. 6 is a block diagram illustrating a storage device and a storage system including the storage device according to an example embodiment.

FIG. 6 is a block diagram illustrating a storage device and a storage system including the storage device according to example embodiments.

Referring to FIG. 6, a storage system 100 includes a host device 200 and a storage device 300.

The host device 200 controls overall operations of the storage system 100. The host device 200 may include a host processor 210 and a host memory 220. The host processor 210 may control an operation of the host device 200. For example, the host processor 210 may execute an operating system (OS). The host memory 220 may store instructions and/or data that are executed and/or processed by the host processor 210.

The storage device 300 is accessed by the host device 200. The storage device 300 may include a storage controller 310 (e.g., a control circuit), a plurality of nonvolatile memories 320a, 320b and 320c, and a buffer memory 330.

The storage controller 310 may control an operation of the storage device 300. For example, the storage controller 310 may control operations of the plurality of nonvolatile memories 320a to 320c based on a request (or command) REQ received from the host device 200. For example, the storage controller 310 may transmit a response RSP (e.g., a signal, a message, etc.) indicating a result of the request REQ to the host device 200.

The plurality of nonvolatile memories 320a to 320c may be controlled by the storage controller 310, and may store a plurality of data. For example, the plurality of nonvolatile memories 320a to 320c may store the meta data or various user data. As will be described with reference to FIG. 10, a plurality of logical units may be formed on the plurality of nonvolatile memories 320a to 320c.

In an example embodiment, each of the plurality of nonvolatile memories 320a to 320c includes a NAND flash memory. In an example embodiment, each of the plurality of nonvolatile memories 320a to 320c includes one of a phase change random access memory (PRAM), a resistive random access memory (RRAM), a magnetic random access memory (MRAM), or a ferroelectric random access memory (FRAM).

The buffer memory 330 may store instructions and/or data that are executed and/or processed by the storage controller 310, and may temporarily store data stored in or to be stored into the plurality of nonvolatile memories 320a to 320c. For example, the buffer memory 330 may include at least one of various volatile memories, e.g., a dynamic random access memory (DRAM).

The storage controller 310 may include a BID manager (or defragmentation manager) 312 (e.g., a logic circuit) to perform the method of operating the storage device according to example embodiments described with reference to FIG. 1. For example, the storage controller 310 and/or the BID manager 312 may receive the first request from the host device 200 to check whether the boot code is fragmented from the host device 200, may output the first response including the first information indicating whether the boot code is fragmented to the host device 200 based on the first request, may receive the second request to perform the defragmentation on the boot code from the host device 200 when it is determined that the boot code is fragmented, and may perform the defragmentation on the boot code based on the second request such that the boot code has physical continuity.

In addition, the storage controller 310 and/or the BID manager 312 may perform a method of a storage device according to example embodiments, which will be described with reference to FIGS. 14, 16, 18, 20, 21 and 22.

In an example embodiment, the storage device 300 is a universal flash storage (UFS) device. In other example embodiments, the storage device 300 may be one of a solid state drive (SSD), a multi-media card (MMC), an embedded multi-media card (eMMC), a secure digital (SD) card, a micro SD card, a memory stick, a chip card, a universal serial bus (USB) card, a smart card, or a compact flash (CF) card.

In an example embodiment, the storage device 300 is connected to the host device 200 via a block accessible interface which may include, for example, a UFS, an eMMC, a nonvolatile memory express (NVMe) bus, a serial advanced technology attachment (SATA) bus, a small computer small interface (SCSI) bus, a serial attached SCSI (SAS) bus, or the like. The storage device 300 may use a block accessible address space corresponding to an access size of the plurality of nonvolatile memories 320a to 320c to provide the block accessible interface to the host device 200, for allowing access by units of a memory block with respect to data stored in the plurality of nonvolatile memories 320a to 320c.

In some example embodiments, the storage system 100 may be any computing system, such as a personal computer (PC), a server computer, a data center, a workstation, a digital television, a set-top box, or a navigation system. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IOT) device, an internet of everything (IoE) device, an e-book reader, a virtual reality (VR) device, an augmented reality (AR) device, a robotic device, a drone, or an automotive device.

Figure 7:
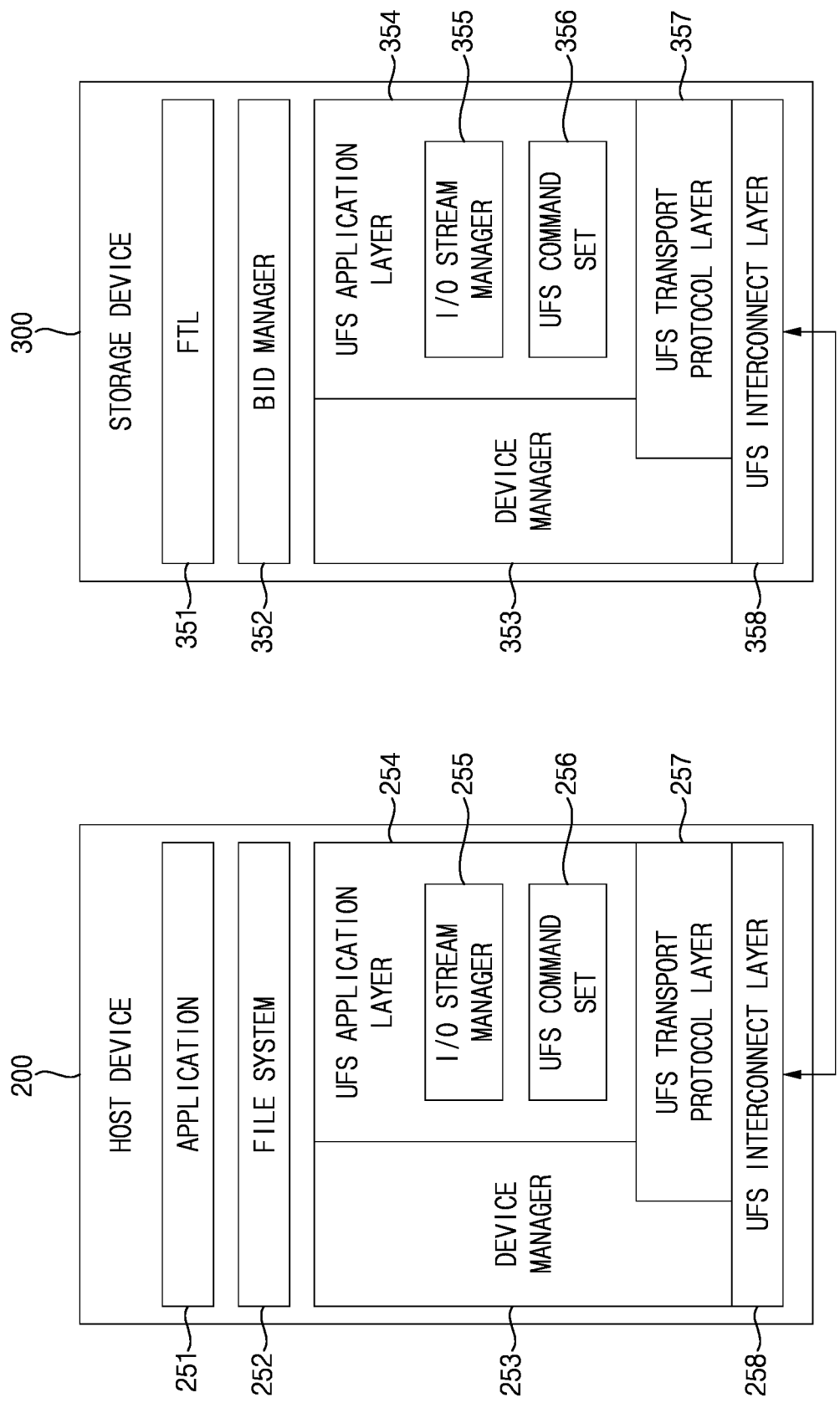
FIG. 7 is a block diagram illustrating an example of a storage device and a storage system of FIG. 6.

FIG. 7 is a block diagram illustrating an example of a storage device and a storage system of FIG. 6.

Referring to FIG. 7, the host device 200 and the storage device 300 may communicate with each other based on the UFS interface defined by the JEDEC standard.

The host device 200 may include an application 251, a file system 252, a device manager 253, a UFS application layer 254, a UFS transport protocol layer 257 and a UFS interconnect layer 258. For example, each layer of the host device 200 may include physical hardware circuits and/or program codes executed by a processor to perform its own function.

The application 251 may be an application software program that is executed on an operating system. For example, the application 251 may include various application programs or processes that are driven by the host device 200 and/or the operating system. The application 251 that is an upper layer may handle a request from a user of the storage system 100. For example, the application 251 may handle normal commands for a read operation and a write operation. For example, the application 251 may provide control at a device level using a query request.

The file system 252 may manage files used by the host device 200. For example, the file system 252 may organize and manage a variety of data (files) generated by the application 251. For example, the file system 252 may generate a logical address corresponding to an access request (e.g., a write request, a read request, etc.) to access the storage device 300.

The UFS application layer 254 may support various commands between the host 200 and the storage device 300. For example, the UFS application layer 254 may include an input/output (I/O) stream manager 255 and a UFS command set 256.

The I/O stream manager 255 may manage a request from the application 251 or the file system 252. For example, the I/O stream manager 255 may identify a particular value of an input/output from the application 251 or the file system 252. For example, the I/O stream manager 255 may direct a move of data written in the storage device 300.

The UFS command set 256 may support various command sets that are supported between the host device 200 and the storage device 300. For example, the UFS command set 256 may include a UFS native command set and a UFS SCSI command set. The UFS command set 256 may configure a command to be transferred to the storage device 300 depending on a request from the application 251 or the file system 252.

The UFS application layer 254 may further include a task manager that processes commands for a control of a command queue.

The device manager 253 may manage operations at a device level and configurations at the device level. For example, the device manager 253 may manage a query request for setting or checking various information of the storage device 300.

The UFS transport protocol layer 257 may provide services for an upper layer. The UFS transport protocol layer 257 may generate a command or information provided from the UFS application layer 254, or a query request provided from the device manager 253 in the form of a UFS protocol information unit (UPIU) packet.

The UFS interconnect layer 258 may manage a connection with the storage device 300. For example, the UFS interconnect layer 258 may include hardware configurations such as an MIPI Unipro or an MIPI M-PHY physically connected with a UFS interconnect layer 358 of the storage device 300.

The host device 200 may further include a device driver. The device driver may control a device and/or a layer included in the host device 200. The device driver may convert a request (e.g., a write request, a read request, etc.) for the storage device 300 generated by the file system 252 to a command capable of being identified by the storage device 300. For example, the file system 252 and the device driver may be included in the operating system, and the application layer 251 may be installed in the operating system. The device driver may control communication with the storage device 300 while managing a hardware resource.

The storage device 300 may include a flash translation layer (FTL) 351, a BID manager 352, a device manager 353, a UFS application layer 354, a UFS transport protocol layer 357 and a UFS interconnect layer 358. The UFS application layer 354 may include an I/O stream manager 355 and a UFS command set 356.

The flash translation layer 351 may perform various functions, such as an address mapping operation, a wear-leveling operation, or a garbage collection operation. The address mapping operation may be an operation of converting a logical address received from the host device 200 into a physical address used to actually store data in a nonvolatile memory (e.g., the nonvolatile memories 320a to 320c in FIG. 6). The wear-leveling operation may be a technique for preventing excessive deterioration of a specific block by allowing blocks of the nonvolatile memory to be uniformly used. As an example, the wear-leveling operation may be implemented using a firmware technique that balances erase counts of physical blocks. The garbage collection operation may be a technique for ensuring usable capacity in the nonvolatile memory by erasing an existing block after copying valid data of the existing block to a new block.

The BID manager 352 may be substantially the same as the BID manager 312 in FIG. 6, and may be implemented to perform the method of operating the storage device according to example embodiments.

Configurations of the device manager 353, the UFS application layer 354, the UFS transport protocol layer 357 and the UFS interconnect layer 358 included in the storage device 300 may be similar to those of the device manager 253, the UFS application layer 254, the UFS transport protocol layer 257 and the UFS interconnect layer 258 included the host device 200 and allows corresponding layers to logically communicate with each other. Thus, additional descriptions will be omitted.

The above-described hierarchical structure and function of each of the host device 200 and the storage device 300 is merely exemplary, and example embodiments are not limited thereto.

Figure 8:
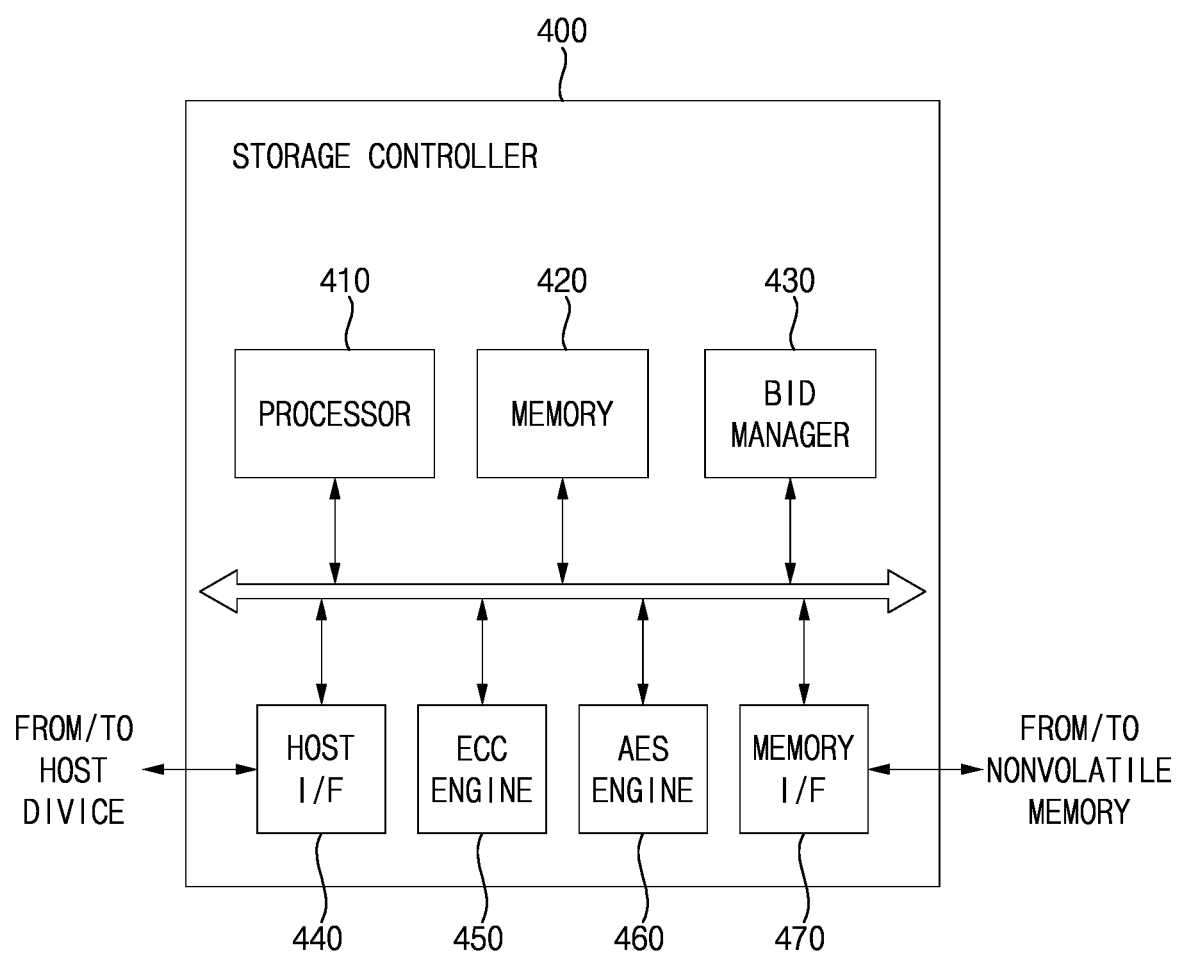
FIG. 8 is a block diagram illustrating an example of a storage controller included in a storage device of FIG. 6.

FIG. 8 is a block diagram illustrating an example of a storage controller included in a storage device of FIG. 6.

Referring to FIG. 8, a storage controller 400 may include a processor 410, a memory 420, a BID manager 430, a host interface (I/F) 440, an error correction code (ECC) engine 450, an advanced encryption standard (AES) engine 460, and a memory interface 470. The storage controller 310 may be implemented by the storage controller 400.

The processor 410 may control an operation of the storage controller 400 in response to a command received via the host interface 440 from a host device (e.g., the host device 200 in FIG. 6). For example, the processor 410 may control an operation of a storage device (e.g., the storage device 300 in FIG. 6), and may control respective components by employing firmware for operating the storage device.

The memory 420 may store instructions and data executed and processed by the processor 410. For example, the memory 420 may be implemented with a volatile memory, such as a static random access memory (SRAM), a DRAM, or a cache memory.

The BID manager 430 may be substantially the same as the BID manager 312 in FIG. 6, and may be implemented to perform the method of operating the storage device according to example embodiments.

The ECC engine 450 for error correction may perform coded modulation using, for example, a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The AES engine 460 may perform at least one of an encryption operation and a decryption operation on data input to the storage controller 400 using a symmetric-key algorithm. The AES engine 460 may include an encryption module and a decryption module. For example, the encryption module and the decryption module may be implemented as separate modules. In another example, a single module capable of performing both encryption and decryption operations may be implemented in the AES engine 460.

The host interface 440 may provide physical connections between the host device and the storage device. The host interface 440 may provide an interface corresponding to a bus format of the host device for communication between the host device and the storage device. In some example embodiments, the bus format of the host device may be, for example, a small computer system interface (SCSI) or a serial attached SCSI (SAS) interface. In other example embodiments, the bus format of the host device may be, for example, a USB, a peripheral component interconnect (PCI) express (PCIe), an advanced technology attachment (ATA), a parallel ATA (PATA), a serial ATA (SATA) or a nonvolatile memory (NVM) express (NVMe) format.

The memory interface 470 may exchange data with a nonvolatile memory (e.g., the nonvolatile memories 320a to 320c in FIG. 6). The memory interface 470 may transfer data to the nonvolatile memory, or may receive data read from the nonvolatile memory. In some example embodiments, the memory interface 470 may be connected to the nonvolatile memory via a single channel. In other example embodiments, the memory interface 470 may be connected to the nonvolatile memory via two or more channels. For example, the memory interface 470 may be configured to comply with a standard protocol, such as Toggle or open NAND flash interface (ONFI).

Figure 9:
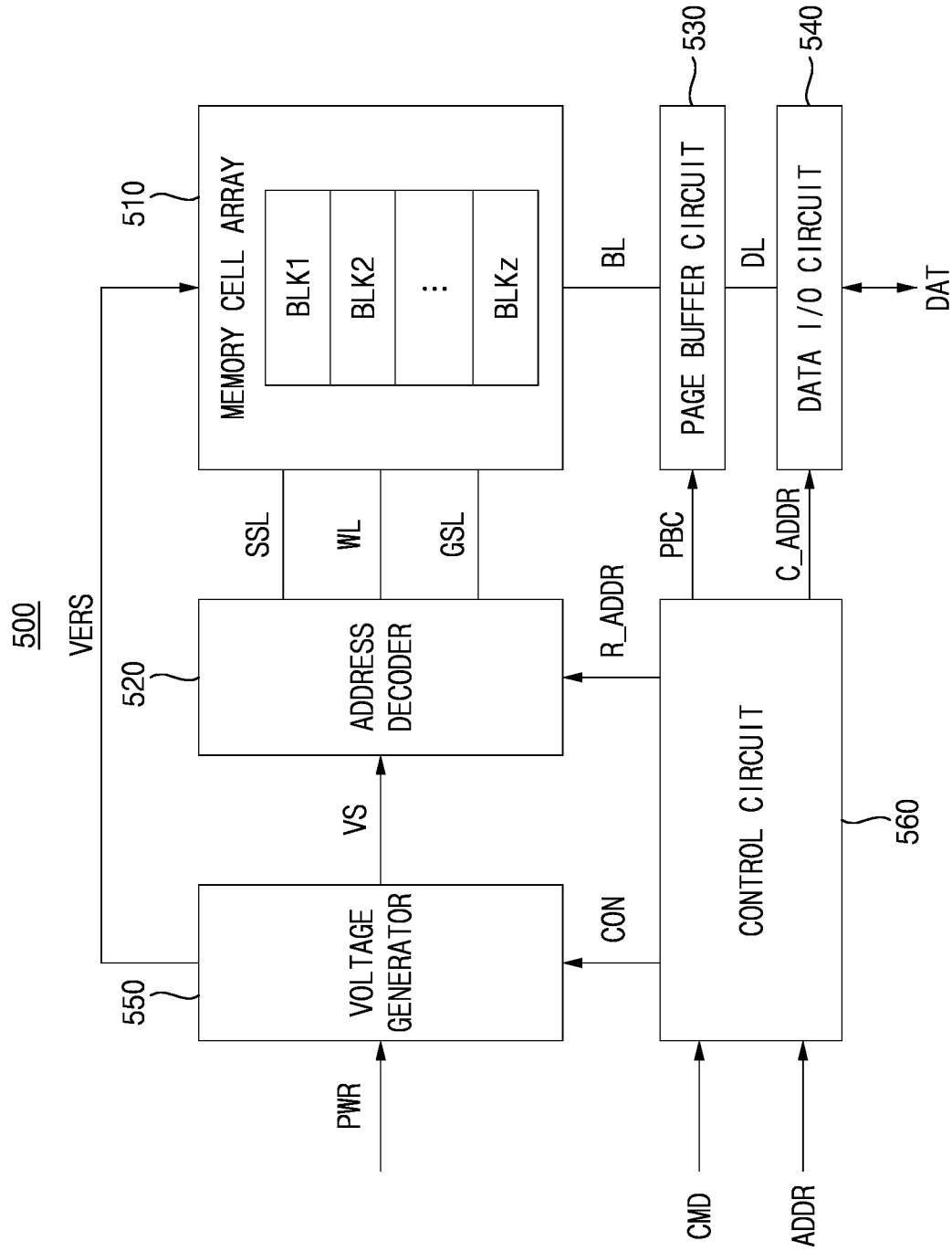
FIG. 9 is a block diagram illustrating an example of a nonvolatile memory included in a storage device of FIG. 6.

FIG. 9 is a block diagram illustrating an example of a nonvolatile memory included in a storage device of FIG. 6.

Referring to FIG. 9, a nonvolatile memory 500 may include a memory cell array 510, an address decoder 520 (e.g., a decoder circuit), a page buffer circuit 530, a data input/output (I/O) circuit 540, a voltage generator 550 and a control circuit 560.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells, where z is a positive integer. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer.

The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 may receive a command CMD and an address ADDR from outside of the nonvolatile memory 500 (e.g., from the storage controller 310 in FIG. 6), and may control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, and may generate a control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are utilized for an operation of the nonvolatile memory 500 based on power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is utilized for the data erase operation based on the power PWR and the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. For example, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Figure 10:
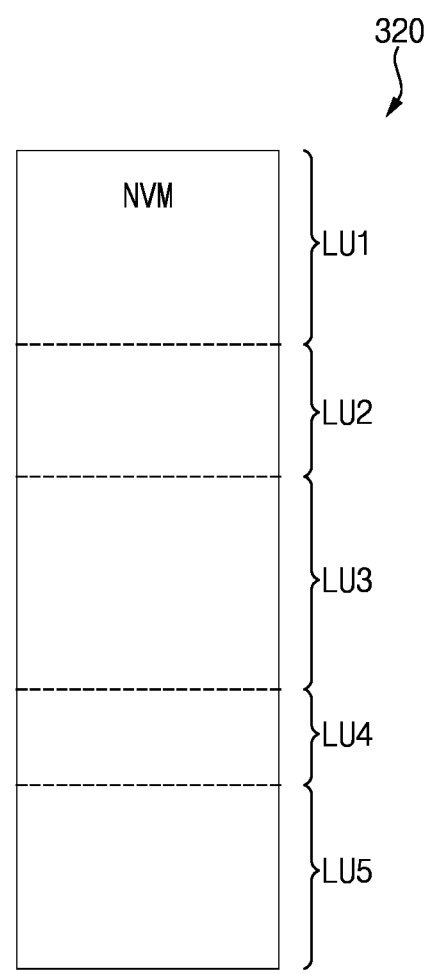
FIG. 10 is a diagram for describing a plurality of logical units included in a storage device of FIG. 6.

FIG. 10 is a diagram for describing a plurality of logical units included in a storage device of FIG. 6.

Referring to FIG. 10, a plurality of logical units LU1, LU2, LU3, LU4 and LU5 may be generated and set on a nonvolatile memory 320 included in the storage device. For example, the storage device implemented with one physical device may be partitioned into a plurality of logical devices (e.g., a plurality of logical units LU1 to LU5), and data may be managed based on the plurality of logical units LU1 to LU5. For example, each logical unit may be used as a separate storage space. For example, sizes of the logical units LU1 to LU5 may be the same or different. At least one of the logical units LU1 to LU5 may be used as a boot logical unit for storing the boot code.

The operation of generating and setting the logical units may be variously implemented according to example embodiments. For example, one logical unit may be generated and set on all or part of two or more nonvolatile memories.

FIGS. 11, 12A, 12B, 12C and 13 are diagrams related to an operation of FIG. 1.

Figure 11:
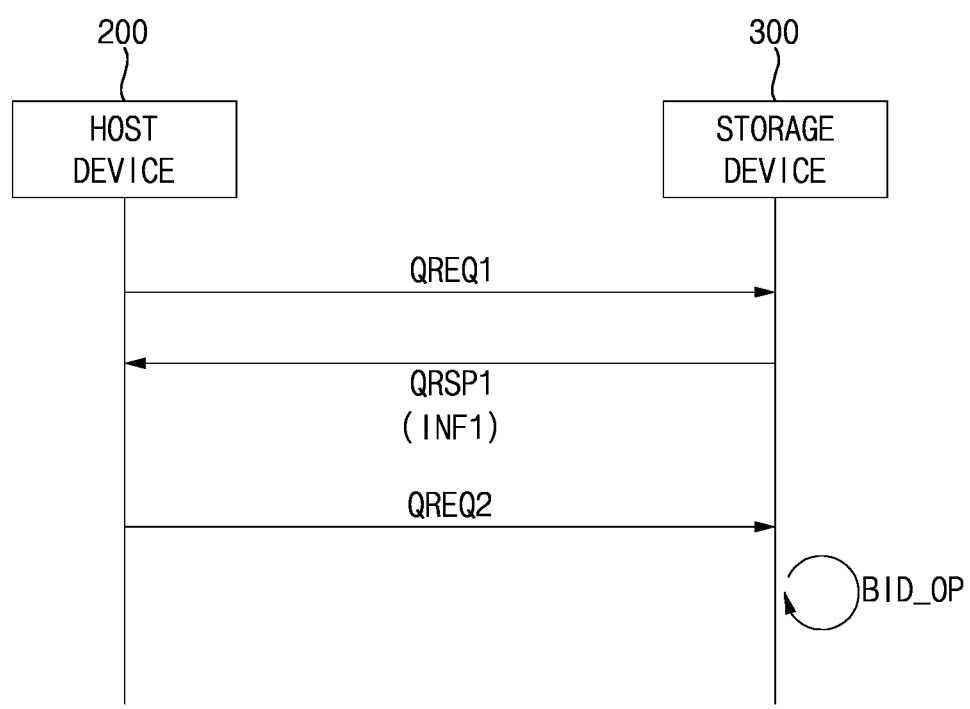
Figure 13:
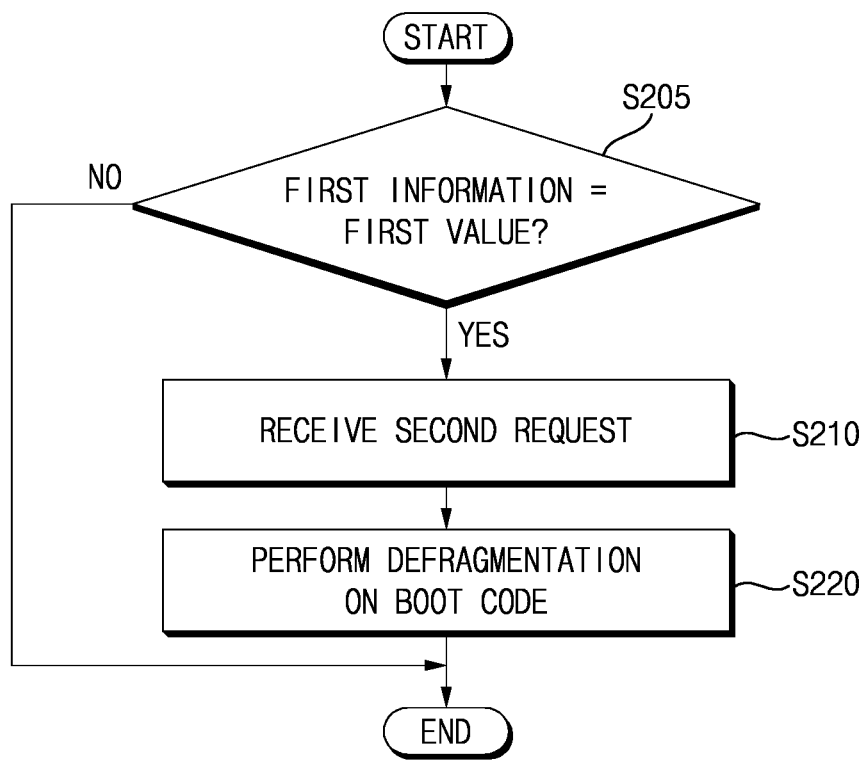

Referring to FIGS. 1 and 11, in operation S110, the host device 200 transmits a first request QREQ1 to the storage device 300. In operation S120, the storage device 300 transmits a first response QRSP1 including first information INF1 to the host device 200 based on or in response to the first request QREQ1.

Based on the first response QRSP1, the host device 200 may determine whether the defragmentation is needed. In operation S210, when it is determined that the defragmentation is needed, the host device 200 transmits a second request QREQ2 to the storage device 300. In operation S220, the storage device 300 performs the defragmentation BID_OP based on or in response to the second request QREQ2.

Referring to FIGS. 11, 12A, 12B and 12C, when the storage device 300 is a UFS device, and when each of the first and second requests QREQ1 and QREQ2 is provided based on the query request defined in the UFS standard and the first response QRSP1 is provided based on the query response defined in the UFS standard, an example of a query request UPIU included in each of the first and second requests QREQ1 and QREQ2 and an example of a query response UPIU included in the first response QRSP1 are illustrated.

As illustrated in FIG. 12A, the query request UPIU may include a plurality of fields, and numbers and names for each field may be denoted. For example, the plurality of fields may include "xx010110b", "Flags", "Reserved", "Task Tag", "Query Function", "Total EHS Length (00h)", "Reserved", "Data Segment Length", "Transaction Specific Fields", "Header E2ECRC", "Data [0]", "Data [1]", "Data [2]", "Data [3]", . . . , "Data [Length-4]", "Data [Length-3]", "Data [Length-2]", "Data [Length-1]", "Data E2ECRC", etc.

As illustrated in FIG. 12B, the query response UPIU may include a plurality of fields, and numbers and names for each field may be denoted. For example, the plurality of fields may include "xx110110b", "Flags", "Reserved", "Task Tag", "Query Function", "Query Response", "Total EHS Length (00h)", "Device Information", "Data Segment Length", "Transaction Specific Fields", "Header E2ECRC", "Data [0]", "Data [1]", "Data [2]", "Data [3]", . . . , "Data [Length-4]", "Data [Length-3]", "Data [Length-2]", "Data [Length-1]", "Data E2ECRC", etc.

In some example embodiments, the query request UPIU included in the first request QREQ1 may be provided by setting a command for reading an "bNeedBIDOperation Attribute" as "Read Attribute 80h (bNeedBIDOperation)" into a field FR1 (e.g., "Transaction Specific Fields"). For example, the "bNeedBIDOperation Attribute" may be implemented as illustrated in FIG. 12C.

In some example embodiments, the query response UPIU included in the first query QRSP1 may be provided by setting the "Read Attribute 80h (bNeedBIDOperation)", which represents the read of "bNeedBIDOperation Attribute", into a field FR2 (e.g., "Transaction Specific Fields"), and by including the first information INF1 in the "Data Field".

In some example embodiments, as illustrated in FIG. 12C, the first information INF1 may have one of a first value 01h and a second value 00h that are different from each other. For example, in the initial operation time as described with reference to FIG. 2, the first information INF1 may have the second value 00h, and this may indicate that the boot code BC is not fragmented and that there is no need to perform the defragmentation. For example, when at least a part of the boot code BC is updated while the storage device is operating as described with reference to FIGS. 3A and 4A, the first information INF1 may have the first value 01h, and this may indicate that the boot code BC is fragmented and that the defragmentation needs to be performed. For example, the value of the first information INF1 may be set and/or changed by the storage device 300 (e.g., by the storage controller 310 and/or the BID manager 312) internally and/or by itself.

In some example embodiments, the query request UPIU included in the second request QREQ2 may be provided by setting a command for writing "bDoBIDOperation Attribute" as "Write Attribute 81h (bDoBIDOperation)" into the field FR1 (e.g., "Transaction Specific Fields"). For example, the "bDoBIDOperation Attribute" may be implemented as illustrated in FIG. 12C.

Referring to FIGS. 1, 11, 12C and 13, an example of selectively performing operations S210 and S220 depending on the first information INF1 is illustrated.

When the first information INF1 has the first value 01h (operation S205: YES), the host device 200 determines that the boot code BC is fragmented and the defragmentation needs to be performed on the boot code BC, and the storage device 300 performs operations S210 and S220. When the first information INF1 has the second value 00h (operation S205: NO), the host device 200 determines that the boot code BC is not fragmented and that there is no need to perform the defragmentation on the boot code BC, and the process may be terminated without performing operations S210 and S220.

Figure 14:
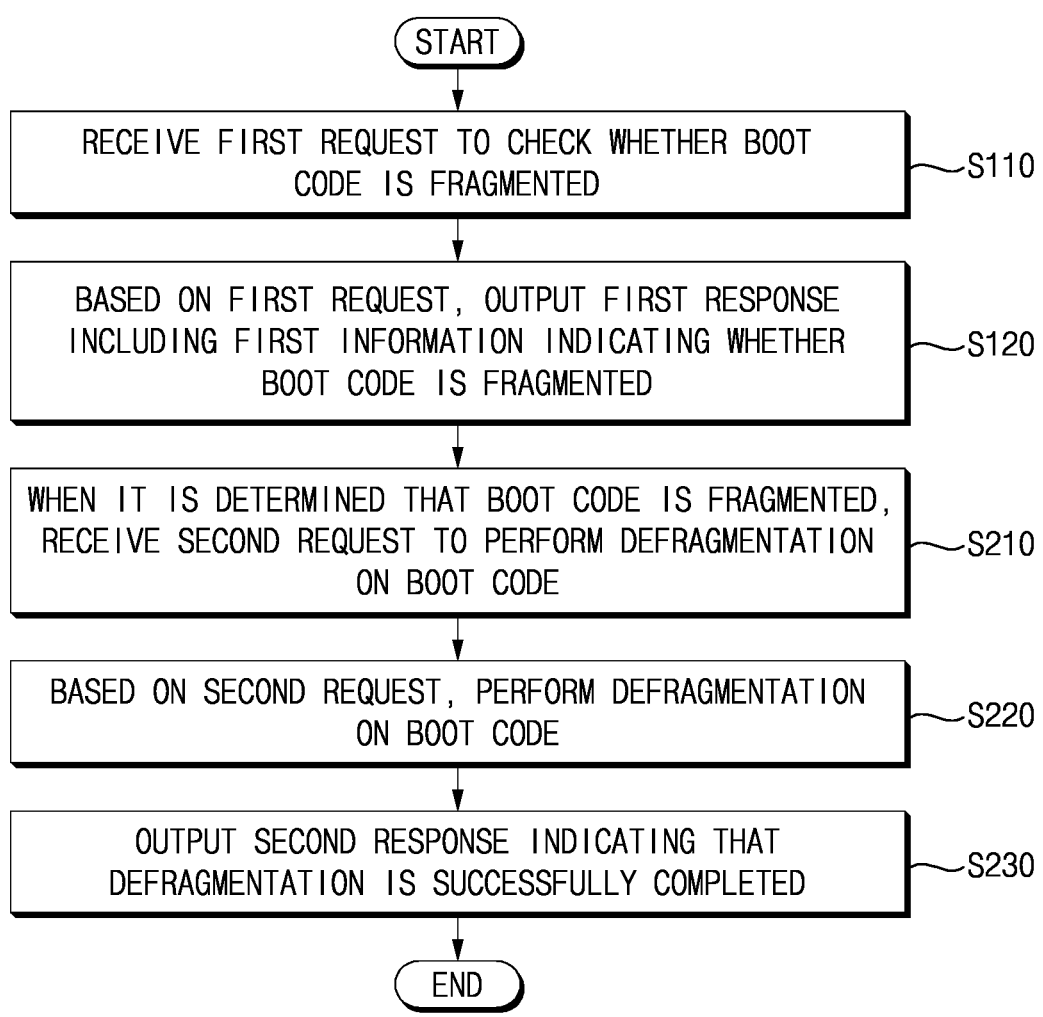
FIG. 14 is a flowchart illustrating a method of operating a storage device according to an example embodiment.
Figure 15:
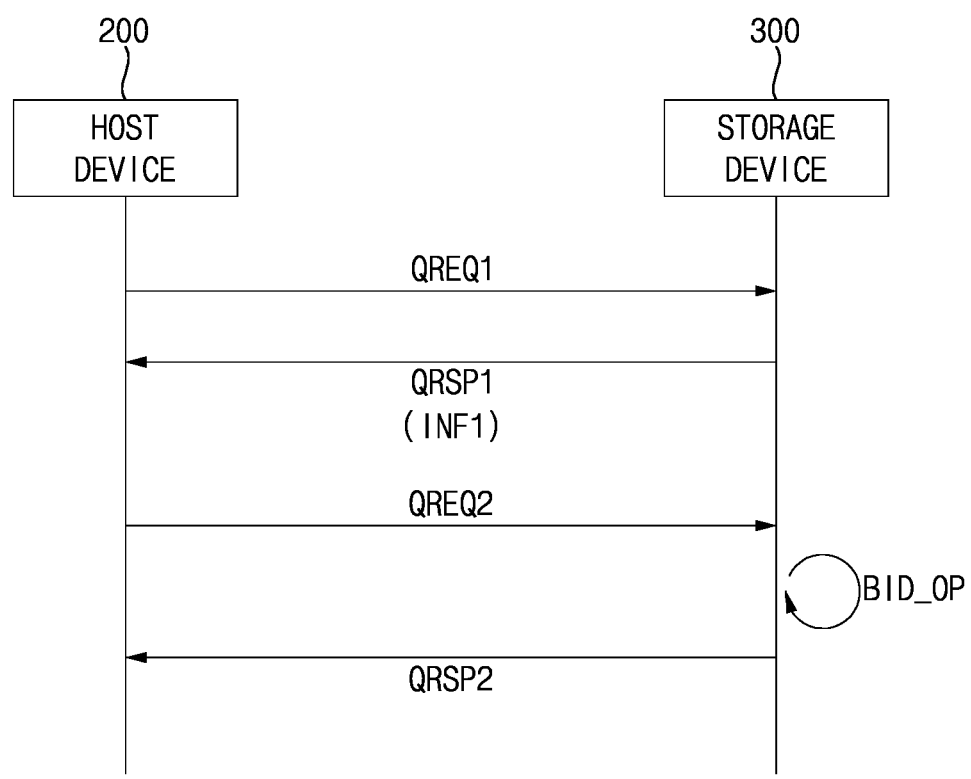
FIG. 15 is a diagram illustrating an operation of FIG. 14.

FIG. 14 is a flowchart illustrating a method of operating a storage device according to an example embodiment. FIG. 15 is a diagram illustrating for describing an operation of FIG. 14.

Referring to FIGS. 14 and 15, in a method of operating a storage device according to an example embodiment, after the defragmentation is performed on the boot code, the storage device outputs a second response indicating that the defragmentation has successfully completed (operation S230). For example, the storage device 300 may transmit a second response QRSP2 to the host device 200.

In some example embodiments, when the storage device 300 is a UFS device, and when the second response QRSP2 is provided based on the query response defined in the UFS standard, the second response QRSP2 may include the query response UPIU similar to the first response QRSP1. For example, the query response UPIU included in the second response QRSP2 may be provided by including information indicating the successful completion of the defragmentation in the "Data Field".

Figure 16:
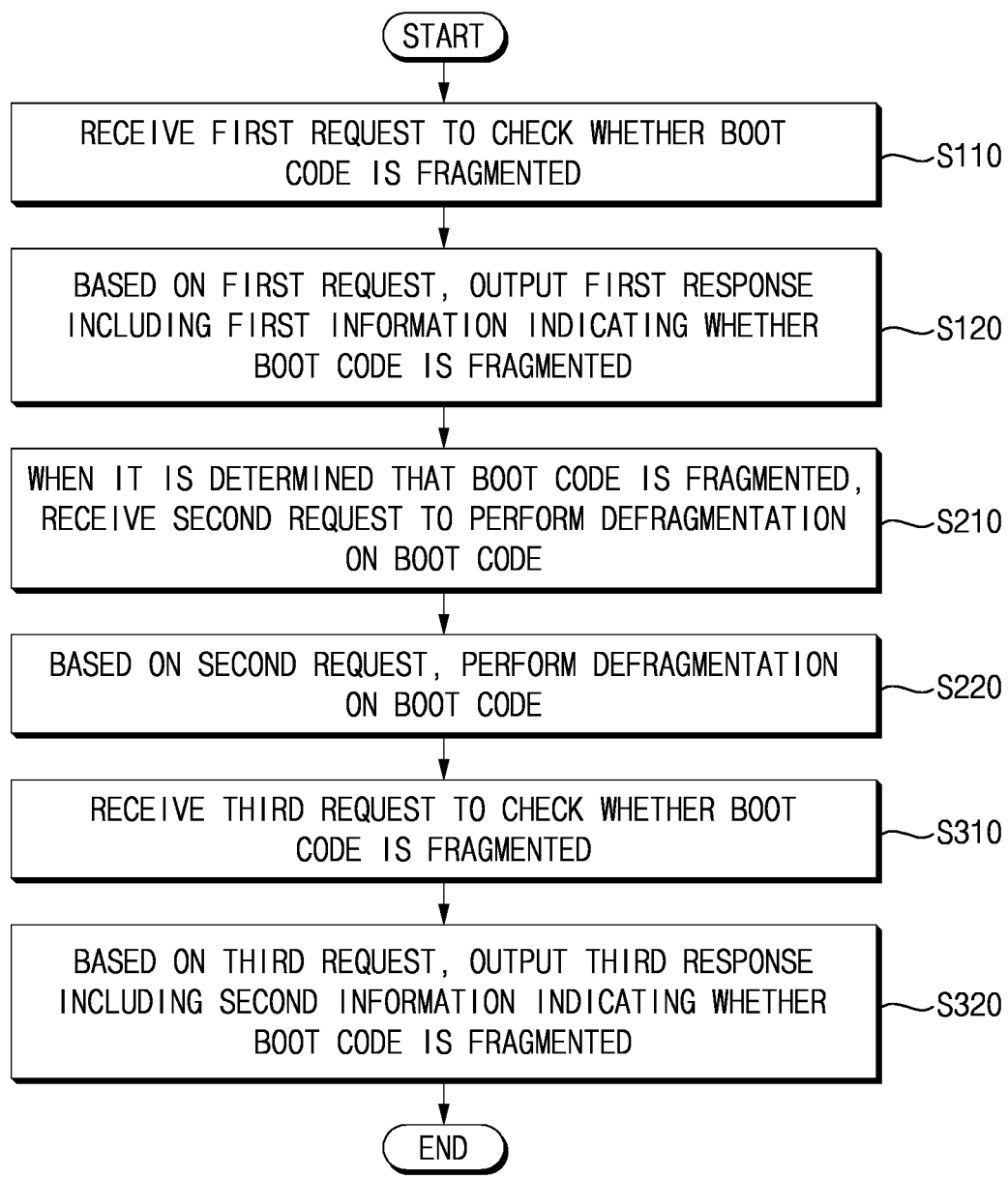
FIG. 16 is a flowchart illustrating a method of operating a storage device according to an example embodiment.
Figure 17:
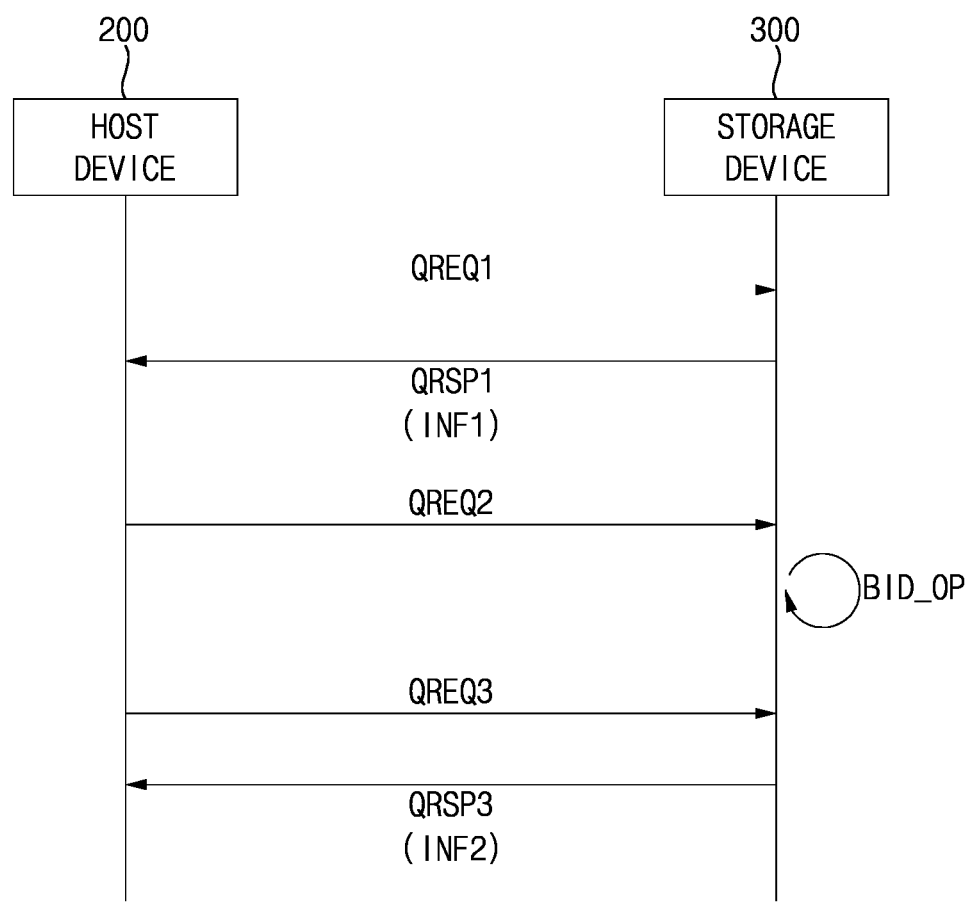
FIG. 17 is a diagram illustrating an operation of FIG. 16.

FIG. 16 is a flowchart illustrating a method of operating a storage device according to an example embodiment. FIG. 17 is a diagram illustrating an operation of FIG. 16.

Referring to FIGS. 16 and 17, in a method of operating a storage device according to an example embodiment, after the defragmentation has been performed on the boot code, the storage device receives a third request to check whether the boot code is fragmented (operation S310), and outputs a third response including second information indicating whether the boot code is fragmented based on the third request (operation S320). For example, the host device 200 may transmit a third request QREQ3 to the storage device 300, and the storage device 300 may transmit a third response QRSP3 including second information INF2 to the host device 200 based on or in response to the third request QREQ3.

In some example embodiments, the third request QREQ3 may be substantially the same as the first request QREQ1, and the third response QRSP3 may be substantially the same as the first response QRSP1. For example, the third request QREQ3 may be defined to have a field configuration or format the same as that of the first request QREQ1, and the third response QRSP3 may be defined to have a field configuration or format the same as that of the first response QRSP1. In other words, when the storage device 300 is a UFS device, and when the third request QREQ3 and the third response QRSP3 are provided based on the query request and query response defined in the UFS standard, respectively, the third request QREQ3 may include the query request UPIU and the third response QRSP3 may include the query response UPIU.

Figure 18:
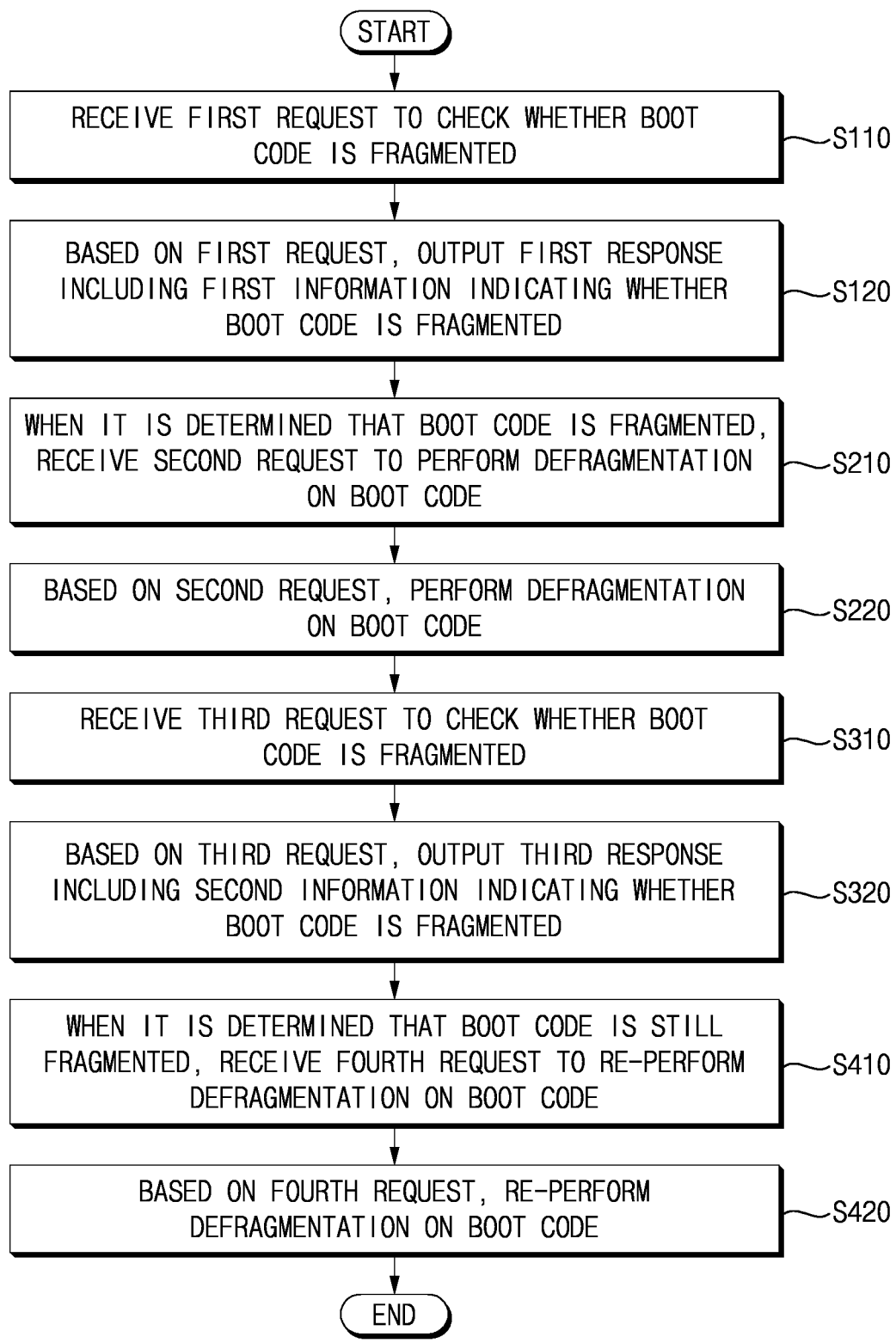
FIG. 18 is a flowchart illustrating a method of operating a storage device according to an example embodiment.
Figure 19:
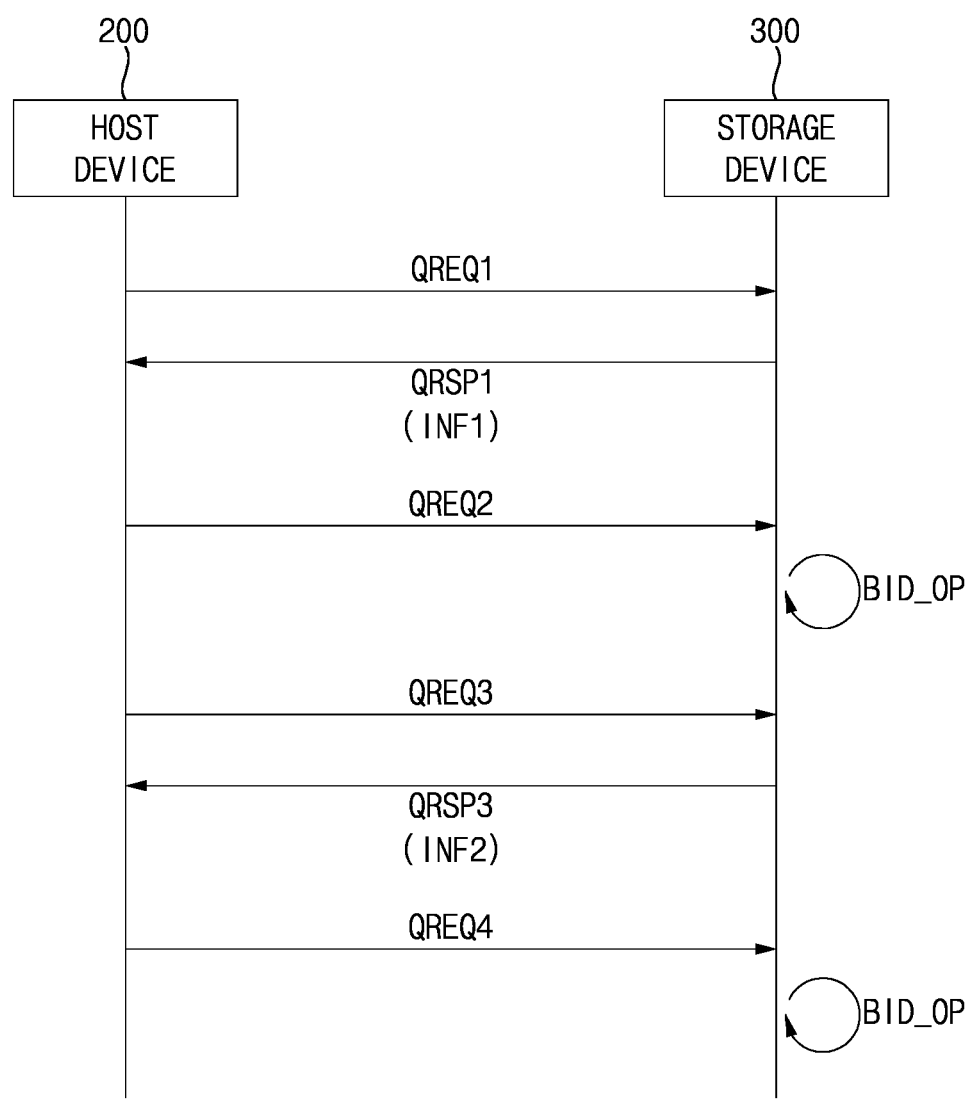
FIG. 19 is a diagram illustrating an operation of FIG. 18.

FIG. 18 is a flowchart illustrating a method of operating a storage device according to an example embodiment. FIG. 19 is a diagram illustrating an operation of FIG. 18.

Referring to FIGS. 18 and 19, in a method of operating a storage device according to an example embodiment, after the third response is output, when it is determined based on the third response that the boot code is still fragmented, the storage device may receive a fourth request to re-perform the defragmentation on the boot code (operation S410), and may re-perform the defragmentation on the boot code based on the fourth request (operation S420). For example, the host device 200 may transmit a fourth request QREQ4 to the storage device 300, and the storage device 300 may re-perform the defragmentation BID_OP based on the fourth request QREQ4. For example, if the defragmentation BID_OP in operation S220 is terminated before being successfully completed, the defragmentation BID_OP may be re-performed as in operation S440.

In some example embodiments, the fourth request QREQ4 may be substantially the same as the second request QREQ2. For example, the fourth request QREQ4 may be defined to have a field configuration or format the same as that of the second request QREQ2.

In some example embodiments, the method of operating the storage device according to example embodiments may be implemented to include all of operation S230 in FIG. 14 and operations S310 and S320 in FIG. 16. In some example embodiments, the method of operating the storage device according to example embodiments may be implemented to include all of operation S230 in FIG. 14 and operations S310, S320, S410 and S420 in FIG. 18. In some example embodiments, after operation S420 in FIG. 18, an operation of outputting a fourth response indicating that the defragmentation has successfully completed may be further included, as in operation S230 of FIG. 14.

Figure 20:
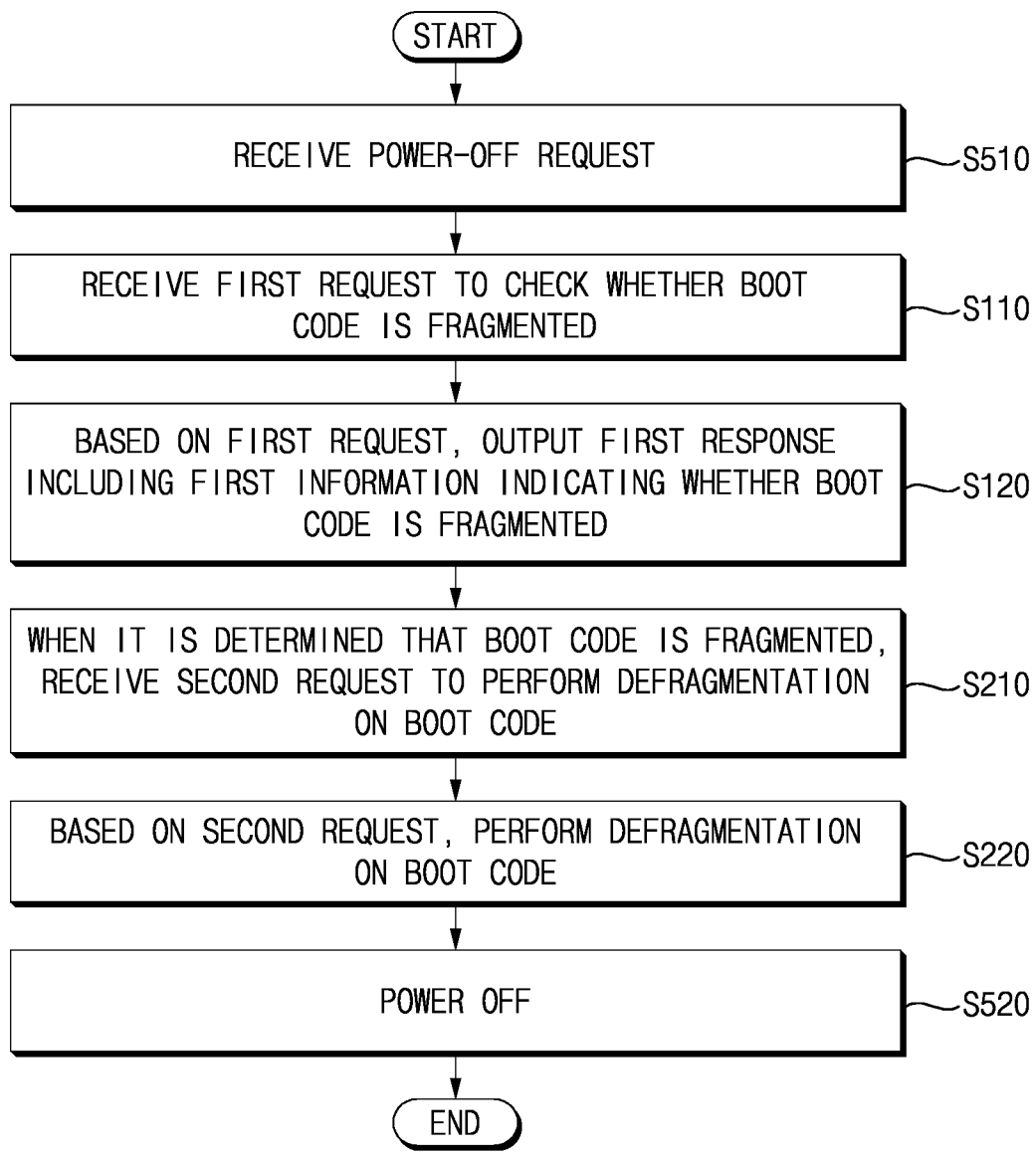
FIGS. 20, 21 and 22 are flowcharts illustrating a method of operating a storage device according to example embodiments.
Figure 21:
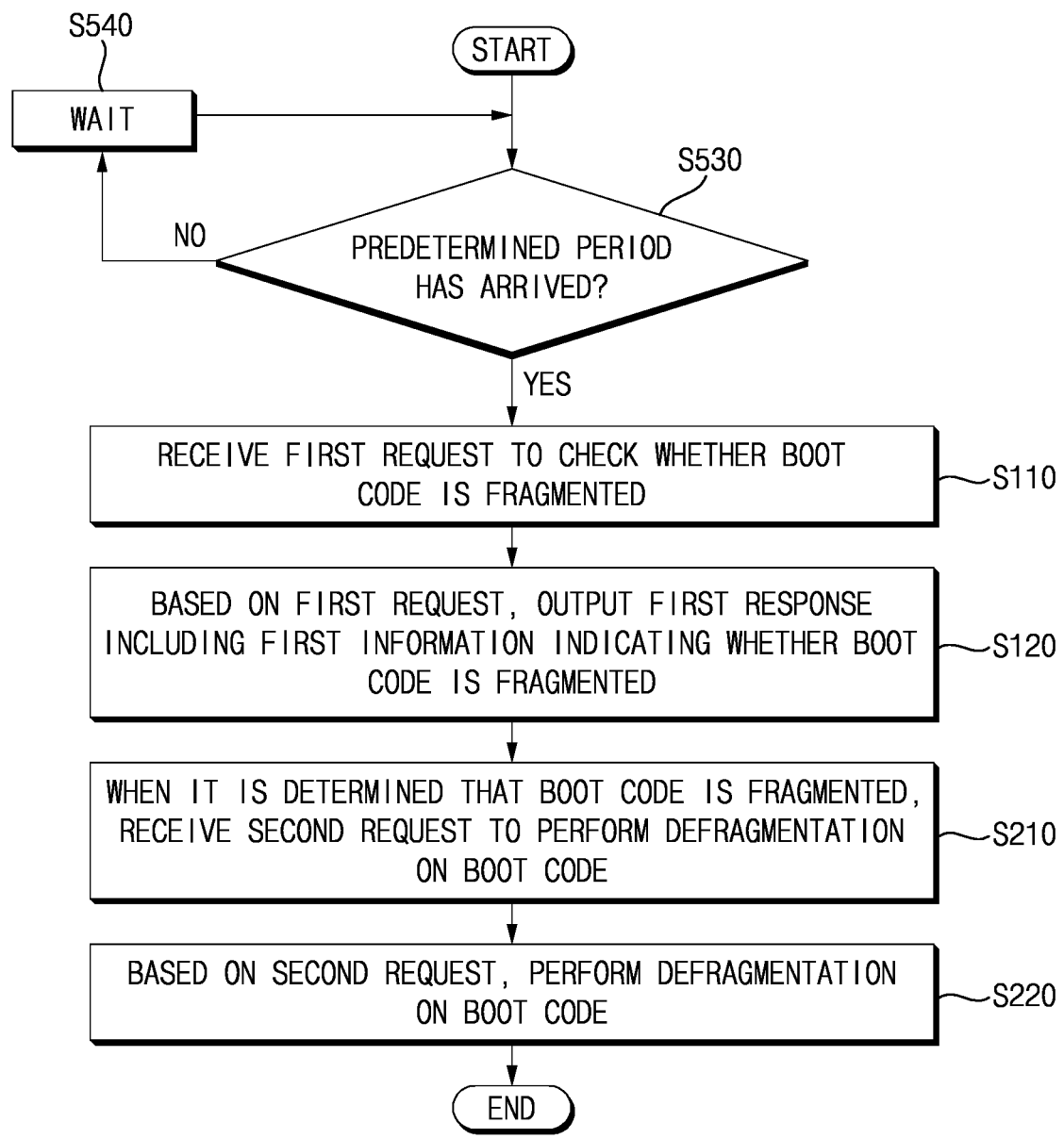
Figure 22:
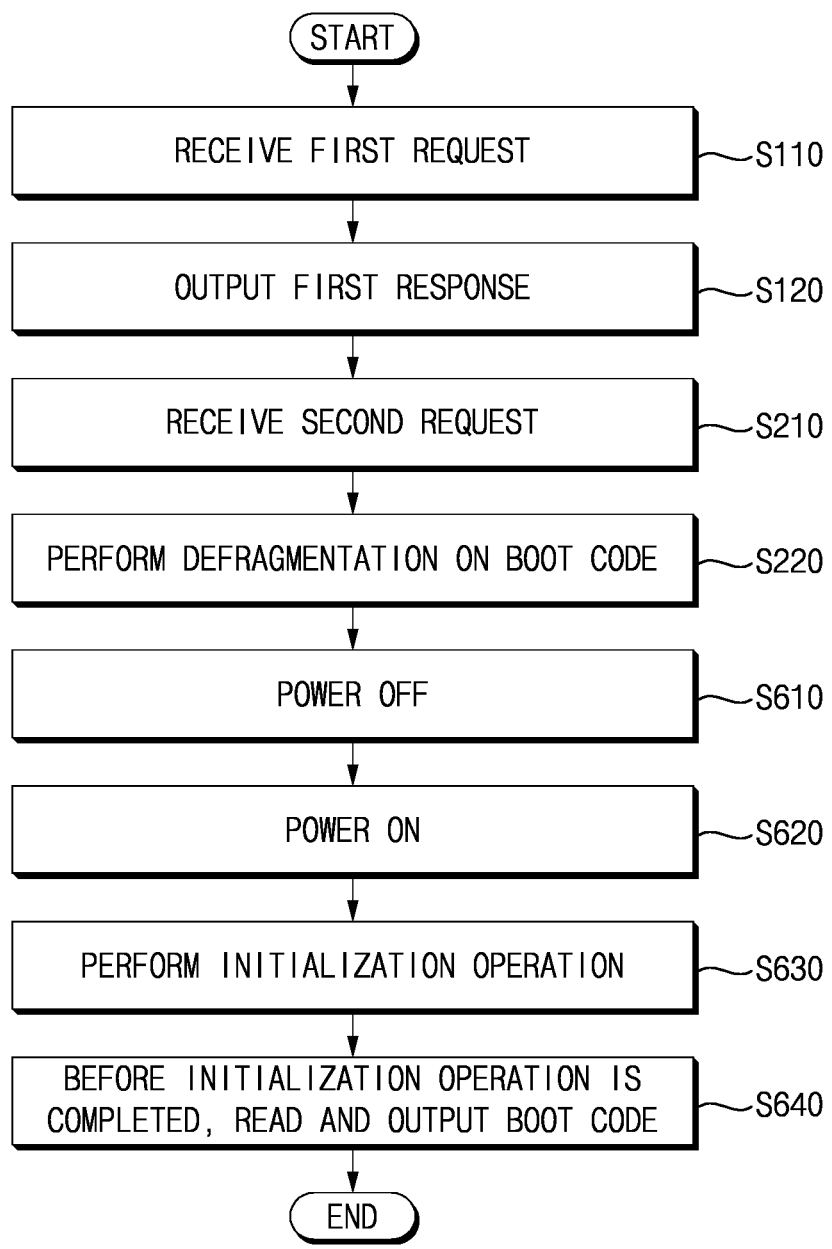

FIGS. 20, 21 and 22 are flowcharts illustrating a method of operating a storage device according to example embodiments.

Referring to FIG. 20, a method of operating a storage device according to example embodiments may be implemented to perform the defragmentation on the boot code when power supplied to the storage device is blocked, cut off or interrupted. Thus, when the storage device is powered on later, the boot code may be rapidly or quickly read.

The storage device receives a power-off request to stop an operation of the storage device (operation S510). For example, the power-off request may be a request to normally terminate operations of the storage device and the storage system including the storage device.

Thereafter, operations S110, S120, S210 and S220 are performed. In other words, the first request may be generated based on or in response to the power-off request and may be received after the power-off request is received.

Thereafter, the storage device is powered off (operation S520). In other words, the power supplied to the storage device may be blocked, and the operation of the storage device may be terminated. For example, the power may be blocked after the defragmentation has been successively performed.

However, example embodiments are not limited thereto, and the storage device may perform the defragmentation on the boot code based on at least one of other various events. For example, when a sudden power-off (SPO) event in which the power supplied to the storage device is suddenly turned off without preparation occurs, operations S110, S120, S210 and S220 may be performed.

Referring to FIG. 21, a method of operating a storage device according to an example embodiment is implemented to perform the defragmentation on the boot code while the storage device is operating or being driven. Thus, when the storage device is powered on later, the boot code may be rapidly or quickly read.

For example, the storage device checks whether a predetermined period or cycle has arrived (operation S530). When the predetermined period has arrived (operation S530: YES), operations S110, S120, S210 and S220 may be performed. In other words, the first request may be received periodically and/or regularly while the storage device is operating. When the predetermined period has not arrived (operation S530: NO), the storage device waits until the predetermined period arrives (operation S540). For example, the storage device may periodically check for the first request during operation S530.

However, example embodiments are not limited thereto, and the storage device may receive the first request aperiodically and/or irregularly, and may perform the defragmentation on the boot code based on or in response to the received first request.

Referring to FIG. 22, a method of operating a storage device according to an example embodiment is implemented to perform the defragmentation on the boot code. Thus, when the storage device is powered on later, the boot code may be rapidly or quickly read.

For example, after operations S110, S120, S210 and S220 are performed, the storage device may be powered off (operation S610). Operation S610 may be similar to operation S520 in FIG. 20.

Thereafter, the storage device is powered on (operation S620). For example, power is supplied to drive the storage device.

Thereafter, an initialization operation is performed on the storage device (operation S630). Before the initialization operation on the storage device is completed, the boot code is read and output from the at least one boot logical unit (operation S640). For example, in operation S640, the boot code may be read based on a sequential read scheme without using a logical-to-physical mapping table indicating a relationship between logical addresses and physical addresses for the boot code. The sequential read scheme may also be referred to as a sequential boosting scheme. In an embodiment, the initialization operation may include initializing internal registers and circuits needed to operate a flash memory.

Figure 23:
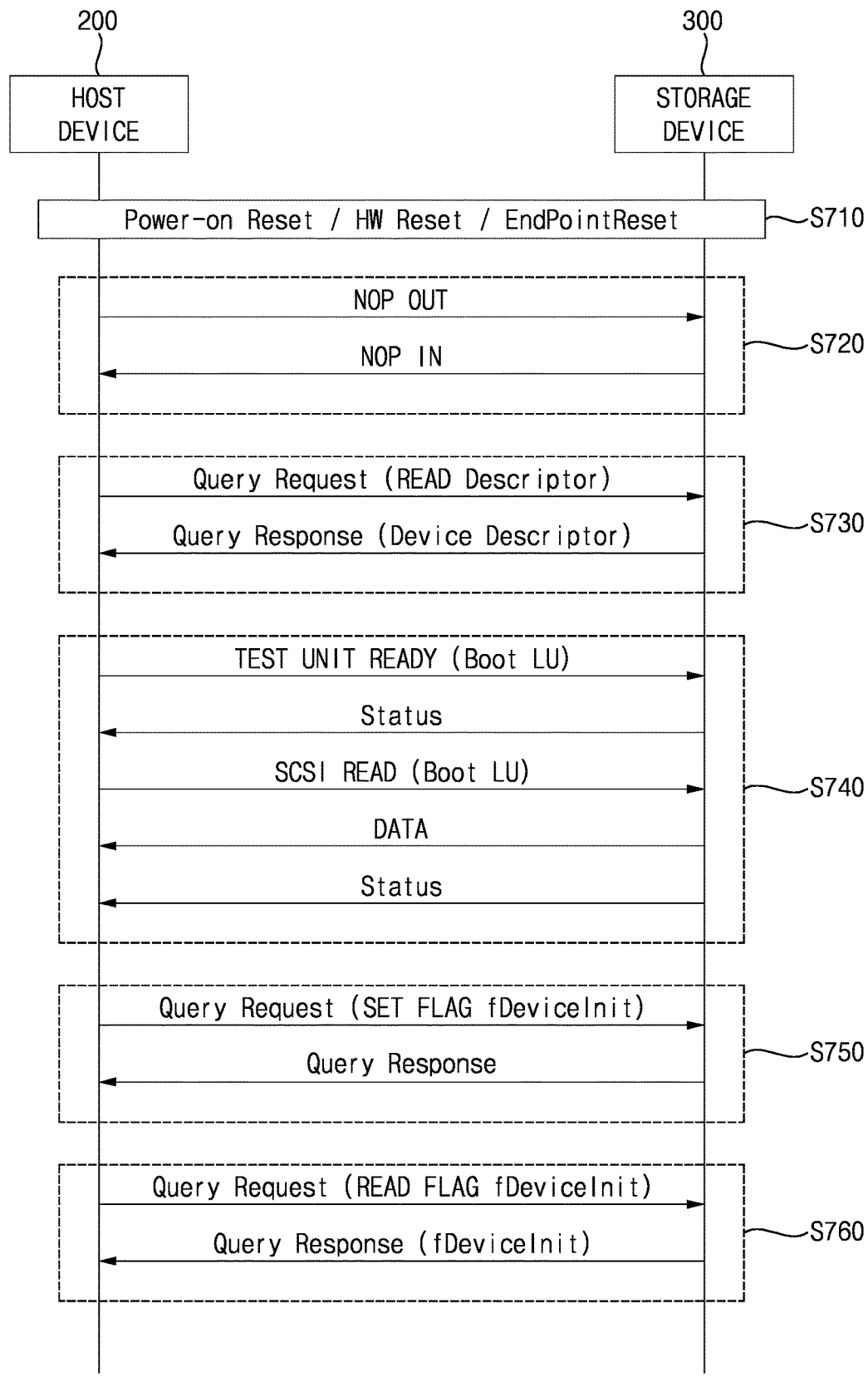

FIGS. 23 and 24 are diagrams for describing a method of operating a storage device according to an example embodiment.

Referring to FIG. 23, an example of the initialization operation of the storage system 100 including the host device 200 and the storage device 300 is illustrated.

First, the host device 200 and the storage device 300 perform an operation such as a power-on reset operation, a hardware reset operation, and/or an endpoint reset operation (operation S710).

After operation S710, the host device 200 and the storage device 300 perform an initialization operation and a boot (or booting) operation. For example, hardware layers of each of the host device 200 and the storage device 300 may be initialized and booted.

For example, the host device 200 and the storage device 300 may perform an initialization on a particular layer (e.g., an UFS transport (UTP) layer) (operation S720). For example, the host device 200 may transfer an NOP OUT UPIU to the storage device 300. The storage device 300 may transfer an NOP IN UPIU to the host device 200 in response to the NOP OUT UPIU.

Next, the host device 200 checks a device descriptor from the storage device 300 (operation S730). For example, the host device 200 may transfer a query request to the storage device 300 for reading a descriptor. The storage device 300 may transfer a query response, which includes the device descriptor, to the host device 200 in response to the query request.

Before the initialization operation is completed, the host device 200 downloads the boot code from the storage device 300 (operation S740). For example, the host device 200 may transfer a TEST UNIT READY UPIU to the storage device 300. The storage device 300 may transfer status information in response to the received TEST UNIT READY UPIU. The host device 200 may determine whether a boot logical unit (or a boot well-known LU) of the storage device 300 is accessible, based on the received status information. When it is determined that the boot logical unit is accessible, the host device 200 may transfer a SCSI READ command to the storage device 300. For example, the SCSI READ command may correspond to or identify the boot logical unit. The storage device 300 may transfer data "DATA" and status information to the host device 200 in response to the received command.

Thereafter, the host device 200 sets a flag of the storage device 300 (operation S750). For example, the host device 200 may transmit a query request to the storage device 300 to set the flag. The query request may be a request for setting a device initialization field (e.g., "fDeviceInit") included in the flag of the storage device 300. In response to the query request, the device initialization field included in the flag of the storage device 300 may be set to a particular value (e.g., "01h"). Afterwards, the storage device 300 may transmit a query response. For example, the storage device 300 may transmit a query response in response to receiving the query request to set the flag.

In addition, the host device 200 may poll the device initialization field (e.g., "fDeviceInit") of the flag of the storage device 300 (operation S760). For example, the host device 200 may transmit a query request to the storage device 300 for reading the device initialization field of the flag, and the storage device 300 may transmit a query response including the device initialization field, to the device 200. After operation S750, when the initialization operation of the storage device 300 is completed, the device initialization field may be reset to a different value (e.g., "00h"). In other words, the host device 200 may repeatedly perform operation S760 to check whether the device initialization field is reset. When the device initialization field is reset, the initialization operation of the host device 200 and the storage device 300 may be successfully completed. For example, it can be assumed that the initialization operation was successful after the device initialization field is reset.

Operations S720, S730, S750 and S760 in FIG. 23 may be included in the initialization operation performed in operation S630 of FIG. 22, and operation S740 in FIG. 23 may correspond to an operation of reading the boot code in operation S640 of FIG. 22.

As described above, the boot code may be read or retrieved before the initialization operation of the storage device 300 is completed. Therefore, if the boot code is quickly read, the initialization and booting performance of the storage device 300 and the storage system 100 may be enhanced.

FIG. 24 illustrates an example where the boot code BC is read using the sequential read scheme after performing the defragmentation BID_OP on the boot code BC stored in the boot logical unit 50 according to an example embodiment.

When the defragmentation BID_OP is performed according to an example embodiment and physical continuity of the boot code BC is ensured or guaranteed, the boot code BC may be read using only a starting logical address for the boot code BC, a starting physical address corresponding to the starting logical address, and a count value corresponding to a size of the boot code BC (e.g., the size and/or number of the boot data D1 to D20). For example, as described with reference to FIGS. 2A, 2B and 5, the starting logical address and the starting physical address may be the logical address LA1 and the physical address PA1 for the first boot data D1 included in the boot code BC, respectively, and the count value may be twenty, which is the number of the boot data D1 to D20 included in the boot code BC.

If physical continuity of the boot code BC is not guaranteed, a logical-to-physical mapping table would be required to read the boot code BC, and the logical-to-physical mapping table may be used by loading into the buffer memory 330. However, in this case, available buffer space of the buffer memory 330 may be insufficient before the initialization operation is completed.

If the defragmentation BID_OP is performed according to example embodiments and physical continuity of the boot code BC is guaranteed, the boot code BC may be read using the sequential read scheme without using the logical-to-physical mapping table. Accordingly, the boot code BC may be read without using the buffer memory 330, the amount of usage in the buffer memory 330 may decrease or be reduced, the boot code BC may be read quickly, and thus the performance of the storage device 300 may be increased.

As described above, when physical continuity of the boot code BC is guaranteed, mapping information associated with or related to the boot code BC may be managed by the sequential boosting scheme rather than using the logical-to-physical (L2P) table. In a management scheme based on the L2P table, logical addresses and physical addresses are matched in a one-to-one correspondence and managed in the buffer memory with a tree structure. Thus, the amount of usage in the buffer memory increases and performance may be limited or degraded. When the sequential boosting scheme is applied or employed according to example embodiments, only the starting logical address, the starting physical address and continuous count values need be recorded, and thus the amount of usage in the buffer memory may be reduced. As a result, the maximum read performance may be guaranteed even if the size of the boot code BC increases.

As will be appreciated by those skilled in the art, example embodiments may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 25:
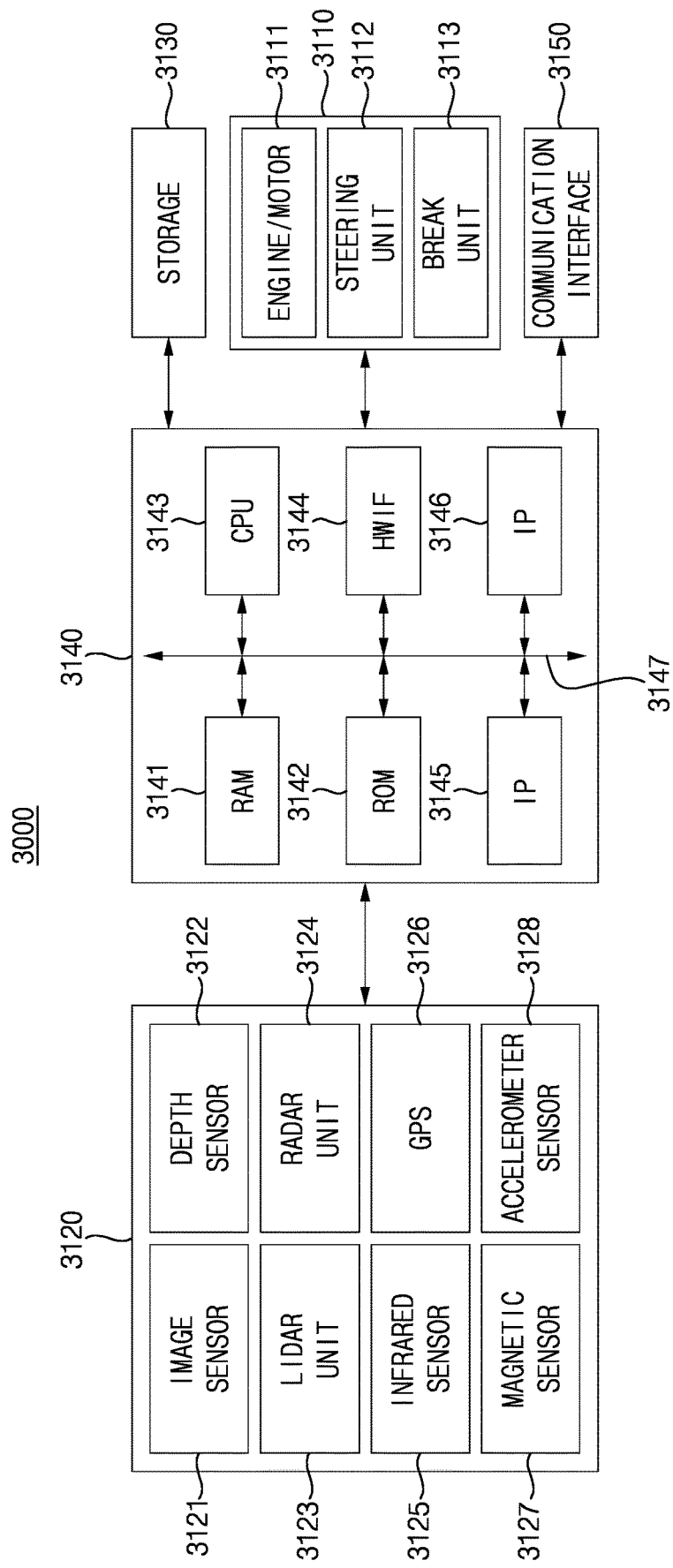
FIGS. 25 and 26 are diagrams illustrating an automotive device according to an example embodiment.
Figure 26:
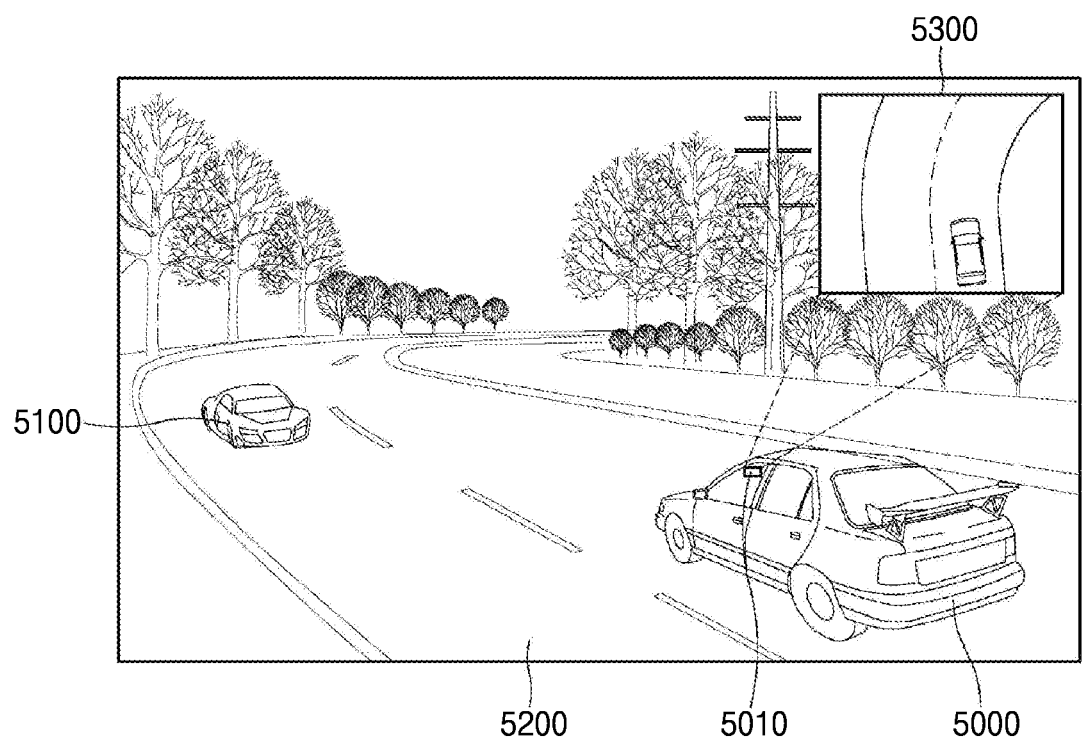

FIGS. 25 and 26 are diagrams illustrating an automotive device according to an example embodiment.

Referring to FIG. 25, an automotive device (or autonomous driving device) 3000 may include a driver (e.g., including circuitry) 3110, a sensor 3120, a storage device 3130, a controller (e.g., including processing circuitry) 3140 and a communication interface 3150.

The driver 3110 may, for example, be a configuration for driving the automotive device 3000 and may include various circuitry. When the automotive device 3000 is implemented as a vehicle, the driver 3110 may include various circuitry and/or components, such as, for example, an engine/motor 3111, a steering unit 3112, and a brake unit 3113.

The engine/motor 3111 may include any combination of an internal combustion engine, an electric motor, a steam locomotive, and a stirling engine. For example, when the automotive device 3000 is a gas-electric hybrid car, the engine/motor 3111 may be a gasoline engine and an electric motor. For example, the engine/motor 3111 may be configured to supply energy for the automotive device 3000 to drive on a predetermined driving route.

The steering unit 3112 may be any combination of mechanisms included to control a direction of the automotive device 3000. For example, when an obstacle is recognized while the automotive device 3000 is driving, the steering unit 3112 may change the direction of the automotive device 3000. When the automotive device 3000 is a vehicle, the steering unit 3112 may be configured to turn the steering wheel clockwise or counterclockwise, and change the direction of travel for the automotive device 3000 accordingly.

The brake unit 3113 may be any combination of mechanisms included to decelerate the automotive device 3000. For example, the brake unit 3113 may use friction or induction to reduce a speed of wheels/tires. When an obstacle is recognized while the automotive device 3000 is driving, the brake unit 3113 may be configured to decelerate or slow the automotive device 3000.

The driver 3110 may be a driver of the automotive device 3000 driving or traveling on the ground, but example embodiments are not limited thereto. The driver 3110 may include a flight propulsion unit, a propeller, wings, etc., and may include a variety of vessel propulsion devices in accordance with various example embodiments.

The sensor 3120 may include a number of sensors configured to sense information relating to a surrounding environment of the automotive device 3000. For example, the sensor 3120 may include at least one of an image sensor 3121, a depth camera 3122, a light detection and ranging (LIDAR) unit 3123, a radio detection and ranging (RADAR) unit 3124, an infrared sensor 3125, a global positioning system (GPS) 3126, a magnetic sensor 3127, and/or an accelerometer sensor 3128.

The image sensor 3121 may be configured to capture an image of or other data related to an external object located outside of the automotive device 3000. The captured image or other data related to the external device may be used as data for changing at least one of a velocity and direction of the automotive device 3000. The image sensor 3121 may include a sensor of various types, such as a charge coupled device (CCD) and a complementary metal oxide semiconductor (CMOS). In addition, the depth camera 3122 may acquire a depth for determining a distance between the automotive device 3000 and an external object.

The LIDAR unit 3123, the RADAR unit 3124 and the infrared sensor 3125 may each include a sensor configured to output a particular signal and sense external objects in an environment in which the automotive device 3000 is located. For example, the LIDAR unit 3123 may include a laser light source and/or laser scanner configured to radiate a laser, and a detector configured to detect reflection of the laser. The RADAR unit 3124 may be a sensor configured to sense objects in the environment in which the automotive device 3000 is located, using a wireless signal. In addition, the RADAR unit 3124 may be configured to sense speeds and/or directions of the objects. The infrared sensor 3125 may be a sensor configured to sense external objects in an environment in which the automotive device 3000 is located using a light of a wavelength of an infrared area.

The GPS 3126, the magnetic sensor 3127, and the accelerometer sensor 3128 may each include a sensor configured to acquire information relating to a velocity, direction, location, etc., of the automotive device 3000. For example, information relating to a current state of the automotive device 3000 may be acquired and a possibility of collision with an external object, etc., may be identified and/or estimated. The GPS 3126 may be configured to identify a location of the automotive device 3000 as a latitude, longitude and altitude data through signals communicated with a satellite, and the magnetic sensor 3127 and the accelerometer sensor 3128 may be configured to identify the current state of the automotive device 3000 according to momentum, acceleration and orientation of the automotive device 3000.

The storage device 3130 may be configured to store data used by the controller 3140 to execute various processing. For example, the storage device 3130 may be realized as an internal memory such as a read-only memory (ROM), random access memory (RAM) and the like included in the controller 3140, and may be realized as a separate memory from the controller 3140. In this case, the storage 3130 may be realized in the form of a memory embedded in the automotive device 3000, or may be realized in the form of a memory that may be detachable from the automotive device 3000 according to the usage of data storage. For example, data for driving the automotive device 3000 may be stored in a memory embedded in the automotive device 3000, and data for an extension function of the automotive device 3000 may be stored in a memory that may be detached from the automotive device 3000. The memory embedded in the automotive device 3000 may be realized in the form of a non-volatile memory, volatile memory, flash memory, hard disk drive (HDD), solid state drive (SDD), or the like, and the memory that may be detached from the automotive device 3000 may be realized in the form of a memory card (e.g., micro SD card, universal serial bus (USB) memory), an external memory that is connectable to a USB port (e.g. USB memory), and the like.

The communication interface 3150 may include various communication circuitry and may be configured to facilitate communication between the automotive device 3000 and an external device. For example, the communication interface 3150 may transmit and receive driving information of the automotive device 3000 to and from the external device. For example, the communication interface 3150 may be configured to perform communication through various communication methods such as an Infrared (IR) communication, a Wireless Fidelity (WI-FI), Bluetooth, Zigbee, Beacon, near field communication (NFC), WAN, Ethernet, IEEE 1394, HDMI, USB, MHL, AES/EBU, Optical, Coaxial, and the like. In some example embodiments, the communication interface 3150 may be configured to communicate driving information through a server.

The controller 3140 may include a read-only-memory (RAM) 3141, a read-only-memory (ROM) 3142, a central processing unit (CPU) 3143, a hardware interface device (HWIF) 3144, a plurality of intellectual properties (IPs) 3145 and 3146, and a bus 3147. The RAM 3141, the ROM 3142, the CPU 3143 and the hardware interface device 3144 may be connected to each other through the bus 3147, or at least two components may be directly connected through direct signal lines. The controller 3140 may be implemented as a system on chip (SOC).

The RAM 3141 may be a memory for reading, from the storage 3130, various instructions, etc., related to driving of the automotive device 3000. The ROM 3142 may store a set of instructions for system booting. In response to a turn on command being input to the automotive device 3000 and power being supplied, the CPU 3143 may copy an operating system stored in the storage 3130 into the RAM 3141 according to a command stored in the ROM 3142, and boot the system by executing the operating system. If booting is completed, the CPU 3143 may perform various operations by copying various types of application programs stored in the storage 3130 into the RAM 3141 and executing the application programs copied into the RAM 3141. The controller 3140 may perform various operations using a module stored in the storage 3130.

The controller 3140 and the storage 3110 may correspond to the host device 200 and the storage device 300 included in the storage system 100 according to example embodiments, respectively, and may perform the defragmentation on the boot code according to example embodiments when the boot code is fragmented, thereby increasing performance of reading the boot code.

Referring to FIG. 26, a control system 5010, such as an advanced driver assistance system (ADAS), an autonomous driving system, or the like, may be installed in an automotive device (e.g., a vehicle) 5000.

The control system 5010 may include various instances of circuitry and components configured to receive a video sequence including a stereo image, reflected waves (e.g., reflected electromagnetic waves), or reflected lights from a camera mounted in the vehicle 5000 and determine occurrence of various events associated with the vehicle 5000. The various events may include object detection, object tracking and scene segmentation. The control system 5010 may generate an output signal that includes a notification message that may be presented to an occupant (e.g., user) of the vehicle 5000, via one or more user interfaces of the vehicle 5000, based on a determined occurrence of one or more events. The control system 5010 may generate an output signal that causes a vehicle control system of the vehicle 5000 to control one or more driving elements of the vehicle 5000 to control the driving (e.g., driving trajectory) of the vehicle 5000, based on a determined occurrence of one or more events.

In some example embodiments, the vehicle 5000 may include means of transportation, such as, for example, and without limitation, an automobile, a bus, a truck, a train, a bicycle, a motorcycle, or the like, providing a communication function, a data processing function, and/or a transportation function.

The example embodiments may be applied to various electronic devices and systems that include the storage devices. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IOT) device, an internet of everything (IoE) device, an e-book reader, a virtual reality (VR) device, an augmented reality (AR) device, a robotic device, a drone, an automotive device, etc.

The foregoing is illustrative of example embodiments and is not to be construed as limiting thereof. Although some example embodiments have been described, those skilled in the art will readily appreciate that many modifications are possible in the example embodiments without materially departing from the example embodiments. Accordingly, all such modifications are intended to be included within the scope of the example embodiments. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a storage device including at least one boot logical unit (LU), the method comprising:
   receiving a first request to check whether boot code stored in the at least one boot LU is fragmented;
   outputting a first response including first information in response to the first request, the first information indicating whether the boot code is fragmented;
   when it is determined based on the first information that the boot code is fragmented, receiving a second request to perform a defragmentation on the boot code; and
   performing the defragmentation on the boot code in response to the second request so that the boot code has physical continuity,
   wherein the boot code is read based on a sequential read scheme without using a logical-to-physical mapping table indicating a relationship between logical addresses and physical addresses for the boot code.

2. The method of claim 1,
   wherein the boot code includes a plurality of boot data that are sequentially read and executed, and
   wherein, when the defragmentation is performed on the boot code, the plurality of boot data are rewritten such that an order of reading and executing the plurality of boot data and an order of physically storing the plurality of boot data are equal to each other.

3. The method of claim 2, wherein, when the defragmentation is performed on the boot code, a plurality of physical addresses for the plurality of boot data have values that sequentially increase or decrease.

4. The method of claim 1,
   wherein, when the first information has a first value, it is determined that the boot code is fragmented and the defragmentation on the boot code is needed, and
   wherein, when the first information has a second value different from the first value, it is determined that the boot code is not fragmented and the defragmentation on the boot code is not needed.

5. The method of claim 4, wherein, when the boot code is updated while the storage device is operating and the at least one boot LU includes one or more invalid data, the first information is set to have the first value.

6. The method of claim 4,
   wherein, when the first information has the first value, the second request is received and the defragmentation is performed on the boot code, and
   wherein, when the first information has the second value, the method is terminated without receiving the second request and without performing the defragmentation on the boot code.

7. The method of claim 1, further comprising:
   after the defragmentation is performed on the boot code, outputting a second response indicating that the defragmentation has successfully completed.

8. The method of claim 1, further comprising:
   after the defragmentation is performed on the boot code, receiving a third request to check whether the boot code is fragmented; and
   outputting a third response including second information based on the third request, the second information indicating whether the boot code is fragmented.

9. The method of claim 8,
   wherein the third request is defined to have a same format as that of the first request, and
   wherein the third response is defined to have a same format as that of the first response.

10. The method of claim 8, further comprising:
    when it is determined based on the third response that the boot code is still fragmented, receiving a fourth request to re-perform the defragmentation on the boot code; and
    re-performing the defragmentation on the boot code in response to the fourth request.

11. The method of claim 1, further comprising:
    receiving a power-off request to stop an operation of the storage device, and
    wherein the first request is received after the power-off request is received.

12. The method of claim 1, wherein the first request is received while the storage device is operating.

13. The method of claim 1, further comprising:
    receiving power to operate the storage device;
    performing an initialization operation on the storage device; and
    before the initialization operation on the storage device has completed, reading and outputting the boot code from the at least one boot LU.

14. The method of claim 1, wherein the boot code is read using only a starting logical address for the boot code, a starting physical address corresponding to the starting logical address, and a count value corresponding to a size of the boot code.

15. The method of claim 1, wherein, when the boot code is read using the sequential read scheme, an amount of usage in a buffer memory included in the storage device decreases.

16. The method of claim 1, wherein the storage device is a universal flash storage (UFS) device.

17. The method of claim 16,
    wherein each of the first request and the second request is provided based on a query request defined in a UFS standard, and
    wherein the first response is provided based on a query response defined in the UFS standard.

18. A storage device comprising:
a plurality of nonvolatile memories configured to form a plurality of logical units (LUs), the plurality of LUs including at least one boot LU configured to store a boot code; and
a storage controller configured to control operations of the plurality of nonvolatile memories, to:
 receive a first request to check whether the boot code is fragmented,
 output a first response including first information in response to the first request,
 receive a second request to perform a defragmentation on the boot code when it is determined based on the first information that the boot code is fragmented, and
 perform the defragmentation on the boot code in response to the second request so that the boot code has physical continuity, the first information indicating whether the boot code is fragmented,
wherein the boot code is read based on a sequential read scheme without using a logical-to-physical mapping table indicating a relationship between logical addresses and physical addresses for the boot code.

19. A method of operating a storage system including a host device and a universal flash storage (UFS) device, the method comprising:
 transmitting, by the host device, a first query request to the UFS device to request that the UFS device check whether a boot code stored in at least one boot logical unit (LU) included in the UFS device is fragmented;
 transmitting, by the UFS device, a first query response to the host device in response to the first query request, the first query response including first information indicating whether the boot code is fragmented;
 determining, by the host device, whether the boot code is fragmented based on the first information received in the first query response; and
 when it is determined that the boot code is fragmented, transmitting, by the host device, a second query request to the UFS device to instruct the UFS device to perform a defragmentation on the boot code,
wherein the boot code is read based on a sequential read scheme without using a logical-to-physical mapping table indicating a relationship between logical addresses and physical addresses for the boot code.

* * * * *